(12) United States Patent
Kinsey et al.

(10) Patent No.: US 7,797,460 B2
(45) Date of Patent: Sep. 14, 2010

(54) ENHANCED NETWORK SYSTEM THROUGH THE COMBINATION OF NETWORK OBJECTS

(75) Inventors: Jeffrey Brian Kinsey, Redmond, WA (US); Pankaj Garg, Redmond, WA (US); Neel K. Jain, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1287 days.

(21) Appl. No.: 11/082,509

(22) Filed: Mar. 17, 2005

(65) Prior Publication Data

US 2006/0209718 A1 Sep. 21, 2006

(51) Int. Cl.
*G06F 15/16* (2006.01)
(52) U.S. Cl. .................. 709/250; 370/254; 370/351
(58) Field of Classification Search .......... 709/250; 703/13–28; 370/254, 351
See application file for complete search history.

(56) References Cited

U.S. PATENT DOCUMENTS

| | | | |
|---|---|---|---|
| 6,707,796 B1 * | 3/2004 | Li | 370/254 |
| 7,181,542 B2 * | 2/2007 | Tuomenoksa et al. | 709/250 |
| 7,389,359 B2 * | 6/2008 | Jain et al. | 709/238 |
| 2006/0104295 A1 * | 5/2006 | Worley et al. | 370/401 |

OTHER PUBLICATIONS

Masputra et al., "An Efficient Networking Transmit Mechanism for Solaris: Multidata Transmit (MDT)", Sun Microsystems, Jan. 12, 2002.
Senapathi et al., "Introduction to TCP Offload Engines", Network and Communications, Power Solutions, Mar., 2004, 103-107.

* cited by examiner

*Primary Examiner*—Yves Dalencourt
*Assistant Examiner*—Michael C Lai
(74) *Attorney, Agent, or Firm*—Woodcock Washburn LLP

(57) ABSTRACT

Reducing the cost of framing network packets in a virtual machine environment combines certain network objects to eliminate the cost of fully framing packets between the combined objects. In a virtual environment, for example, this allows a virtual NIC in one partition to send only data to a network provider partition and to rely on the latter to frame and route the data. A source network object, destination network object, or an intermediate network object may enable a separate intermediate network object to frame its data so that the network system may take advantage of offload framing when one or more of the intermediate network object's ports has the capacity to offload framing.

14 Claims, 19 Drawing Sheets

ENHANCED NETWORK SYSTEM THROUGH THE COMBINATION OF NETWORK OBJECTS

FIELD OF THE INVENTION

The invention is directed to systems and methods for routing network data in a network including virtual machines (VMs) and, more particularly, the invention is directed to systems and methods of combining network objects in the network to minimize packet framing overhead and to, where possible, offload the framing of a packet to hardware.

BACKGROUND OF THE INVENTION

In a traditional network environment, there are end stations and intermediate stations. Each end station can be thought of as a Network Interface Card (NIC) or network adapter. An end station may be either the originator of a network packet or the final destination of a network packet. The intermediate stations, on the other hand, can be thought of as switches, hubs, routers, repeaters, or the like that are disposed between the end stations to aid them in the delivery of their network packets.

Raw data cannot be sent between two end stations in a network environment since the raw data does not include the information required to get it to the destination. Framing is used to provide such information and to divide the raw data into data packets for the network transmission. As used herein, framing refers to the addition of meta data around the raw data that provides the intermediate stations with information on how to send the packets and provides the destination end station with information on what each packet contains. Framing can be performed many times on a packet and normally occurs once for each OSI level the packet must traverse. Examples of typical framing include TCP/UDP, IP, and Ethernet. As known to those skilled in the art, the framing also might include consistency checks to guarantee the integrity of the packet.

Thus, in traditional network environments, end stations create, send, and receive packets while the intermediate stations either route or forward the packets between end stations or other intermediate stations. In this environment, all stations receive and send fully framed network packets consisting of, at a minimum, routing information and data.

The problem with the traditional network environment is that the framing of network packets has become increasing costly in CPU processing time as the network throughput has gone up. This has been addressed, in part, by providing end stations with the hardware capacity to frame a packet without the CPU cost by offloading the packet framing to hardware. For example, a TCP/IP offload engine (TOE) is a new hardware standard that allows a NIC to perform the framing of a TCP/IP packet in hardware. This technology greatly decreases the amount of CPU processing time required to send and receive network packets. As an example, Virtual PC 2004 and Virtual Server 2005 by Microsoft Corporation frame the network packet before it is sent to the host. Unfortunately, even if the host has a network card capable of framing the packet in hardware, such as TOE, it is not used for the guest's traffic, which continues to be framed in software, costing CPU processing time.

A typical network has a tree topology. The leaves of the tree are the end stations and the branches and the root are the intermediate stations. In a smart (switched) network, the packet flows up the tree through the intermediate stations only as far as necessary to get to the intermediate station that has a lower connection to the destination end station. For example, FIG. 1 illustrates a network topology in which end stations D and E are connected to intermediate station B and end stations F and G are connected to intermediate station C. Intermediate stations B and C are connected to intermediate station A. Thus, to send a packet from end station D to end station G, the packet will travel through intermediate stations A, B, and C. In order to propagate information through the system of FIG. 1, an external protocol must be used to frame the network packets such that all connected network stations can understand the packet. In the example of FIG. 1, the network packets would need to be understood by intermediate stations A, B, and C and sufficient meta data would need to be wrapped around the raw data in the network packets for this purpose. This leads to significant overhead, particularly as the number of intermediate stations increases.

The maximum transmission unit (MTU) specifies the maximum amount of data that can be sent in a single packet (after framing). Typically, Ethernet supports an MTU of 1500 bytes; however, recent Ethernet standards such as gigabit Ethernet have increased the MTU to 9000 bytes. These larger packets are referred to as jumbo frames. The MTU of a local area network (LAN) is generally computed by sending packets of different sizes and seeing which ones timeout or return an error. The MTU of the LAN will then be the largest packet that do not return an error. A LAN with a large MTU will generally have higher performance because large packets will not have to be fragmented. A LAN with a small MTU, on the other hand, will generally require less configuration because it more likely that all of the intermediate stations on the LAN will be able to support the smaller MTU.

Traditional networks are limited by the aggregate bandwidth lost due to the network's tree structure. In other words, while the tree topology is cost effective in terms of hardware and configurability, it is wasteful in terms of bandwidth since the aggregate bandwidth is wasted when packets must travel between intermediate stations with relatively small MTUs. In the above example, when end station D in FIG. 1 must send a packet to end station G, the LAN bandwidth of intermediate stations A, B, and C must be consumed, thereby limiting the aggregate bandwidth.

A solution to these problems is desired that minimizes the amount of framing and offloads the framing to hardware where possible. A solution is also desired that maximizes the network MTU. The invention provides such solutions.

SUMMARY OF THE INVENTION

The invention provides solutions to the network problems mentioned above by combining end stations and intermediate stations and combining intermediate stations with each other. In an exemplary implementation, the invention is used in a virtual machine system since the network entities and their connections are all known, or knowable, to the host system(s) and may be shared to maximize network communication in accordance with the techniques of the invention. In such an enhanced system, end station entities will sometimes send fully framed packets to the intermediate stations or they may send only the data to the intermediate stations and rely on the intermediate station to properly frame the data or offload the framing after the proper route has been determined. The same can be said for the data transfer between two intermediate stations. Once the stations have been combined, the end station in the system can query information, such as the maximum transmission unit (MTU) of the network, from the intermediate station or the intermediate stations can determine optimizations in the network and cause the topology of the network to change.

In exemplary embodiments, a virtual machine system is provided comprising a source network object, an intermediate network object, and a destination network object, as well as a network channel and a control channel. In accordance with the invention, the network channel connects the source network object, the intermediate network object, and/or the destination network object and is configured to send framed data packets between respective network objects. The control channel, on the other hand, is separate from the network channel and connects at least two of the source network object, the intermediate network object, and the destination network object and configured to send control data messages between the connected network objects. In exemplary embodiments, the control channel may comprise a software connection between respective network objects, a packet bus connection between respective network objects, or a sub-protocol of a standard protocol stack for the framed data packets.

In accordance with the invention, the control data messages include routing/topology data for reconfiguring the respective network objects to change a routing of the framed data packets between at least the intermediate network object and the destination network object. The control data messages may also enable respective network objects to setup a path for the sending of not fully framed data packets, or data packets that are inappropriate for transmission, between the respective network objects. Such control data messages may include TCP/IP checksums or a request that a TCP/IP offload engine (TOE) connection be established. In the case of a TOE connection request, the network object receiving the TOE connection request looks up a port corresponding to the network address of the TOE connection request in a routing table to determine that the particular network address is available via an adjacent network object and establishes a communication link between the network object that sent the TOE connection request and the determined adjacent network object by forwarding the received TOE connection request to the adjacent network object. On the other hand, if the network object receiving the TOE connection request determines that the TOE connection request should not be forwarded, the network object handles the TOE connection request locally.

In accordance with a further exemplary embodiment, the control data messages may enable a network object besides the source network object to break apart a partially or fully framed data packet using a large send offload. The control data messages may also enable a network object besides the source network object to frame the data packets with meta data including routing information for each data packet and information on what each data packet contains for transmission to another network object via the network channel. In the latter case, the network object besides the source network object may offload a received message to framing hardware that frames the message into TCP/IP packets.

In another exemplary embodiment of the invention, the control data messages include at least one network property of a network object, such as a maximum transmission unit (MTU) size for a communication path between respective network objects. The source network object may query the intermediate network object for a transmission property of the intermediate network object, or the intermediate network object may push a transmission property of the intermediate network object, such as the MTU, to the source network object. The transmission property data may then be used by the source network object to improve transmission efficiency.

In still another exemplary embodiment of the invention, the techniques of the invention may be used for network reconfiguration. In this embodiment, the intermediate network object provides routing data to the source network object, where the routing data identifies a next intermediate network object and/or the destination network object in a network topology of the virtual machine system. The source network object uses the routing data to create a communications path directly to the destination network object or the next intermediate network object so as to exclude the intermediate network object from the communications path. The next intermediate network object may also provide further routing data to the source network object, where the further routing data identifies an additional intermediate network object and/or the destination network object in the network topology of the virtual machine system. As before, the source network object may use the further routing data to create a communications path directly to the destination network object or the additional intermediate network object so as to exclude the intermediate network object and the next intermediate network object from the communications path. The source network object may also determine that the intermediate network object and an additional network object should be combined and then send a message to both the intermediate network object and the additional intermediate network object instructing them to create a connection to a particular network address so that subsequent messages between them may pass through each such connection.

The scope of the invention also includes corresponding methods of communicating data between respective network objects in a virtualized computer system as well as computer readable media including software that performs the methods of the invention when read by a suitable host computer system. Additional characteristics of the invention will be apparent to those skilled in the art based on the following detailed description.

BRIEF DESCRIPTION OF THE DRAWINGS

The systems and methods for reconfiguring a VM network for communication efficiency and to combine VM network objects to minimize packet framing overhead and to, where possible, offload the framing of a packet to hardware in accordance with the invention are further described with reference to the accompanying drawings, in which.

DETAILED DESCRIPTION OF ILLUSTRATIVE EMBODIMENTS

Overview

Figure 1:
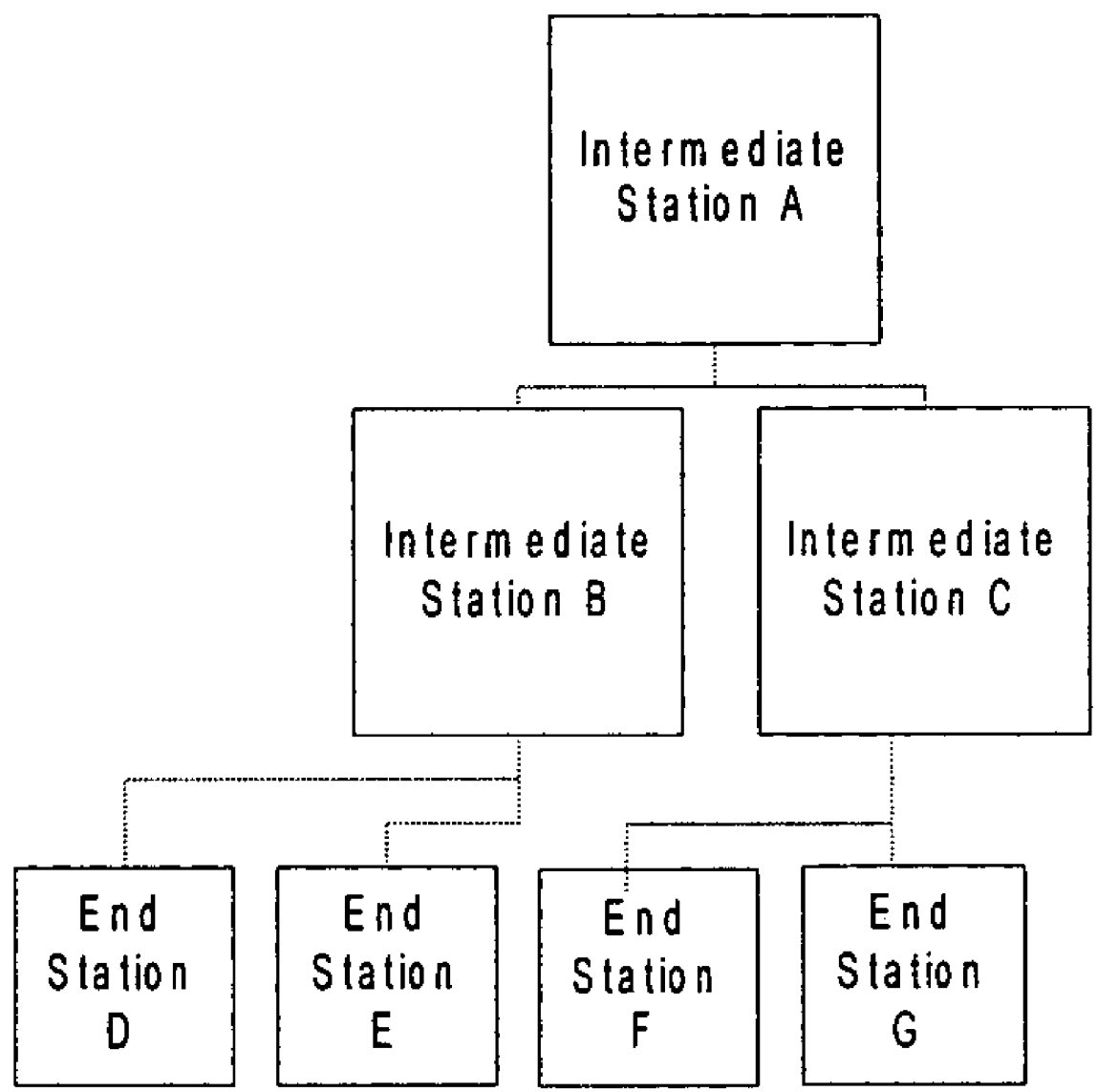
FIG. 1 illustrates an example of a tree topology in a conventional network where the leaves of the tree are the end stations and the branches and the root are the intermediate stations.

The invention provides systems and methods for determining network optimizations in a VM network and combining network objects to provide such optimizations. Generally, a source network object knows the identity of the destination network object but it has no idea of how data is routed to it. By combining the source network object with an intermediate network object, the source network object may learn much more information about the network and use this information to take advantage of features in the intermediate station.

For example, the source network object, the destination network object, or an intermediate network object may enable a separate intermediate network object to frame its data. This feature enables the system to take advantage of offload framing when one or more of the intermediate network object's ports has the capacity to offload framing, including, for example, TCP/IP checksums, large sends, IP security, and TCP/IP offload engines.

In an embodiment of the invention, an intermediate network object performs the offload itself. Even when such an offload is for network objects using the same CPU, it saves CPU processing since these technologies will reduce context switches between the end stations (source and destination network objects) and the intermediate network objects.

In another embodiment of the invention, the source or destination network object may query the intermediate network object for properties or the intermediate network object may push its properties to the source and/or destination network objects through a back control data communications channel that is separate from the data packet communications channel. For example, the maximum transmission unit (MTU) of the local area network (LAN) may be queried by or pushed to the source or destination network object using the control channel.

In yet another embodiment of the invention, an intermediate network object may reconfigure the VM network for the purpose of efficiency by reconfiguring the network tree into a graph for increased performance for traffic moving between the nodes.

Other more detailed aspects of the invention are described below, but first, the following description provides a general overview of and some common vocabulary for virtual machines and associated terminology as the terms have come to be known in connection with operating systems and the host processor ("CPU") virtualization techniques. In doing so, a set of vocabulary is set forth that one of ordinary skill in the art may find useful for the description that follows of the apparatus, systems and methods for determining network optimizations in a VM network and combining network objects to provide such optimizations in accordance with the invention.

Overview of Virtual Machines

Computers include general purpose central processing units (CPUs) or "processors" that are designed to execute a specific set of system instructions. A group of processors that have similar architecture or design specifications may be considered to be members of the same processor family. Examples of current processor families include the Motorola 680X0 processor family, manufactured by International Business Machines (IBM) or Motorola, Inc. of Phoenix, Ariz.; the Intel 80X86 processor family, manufactured by Intel Corporation of Sunnyvale, Calif.; and the PowerPC processor family, which is manufactured by IBM, Inc. and Motorola, Inc. and used in computers manufactured by Apple Computer, Inc. of Cupertino, Calif. Although a group of processors may be in the same family because of their similar architecture and design considerations, processors may vary widely within a family according to their clock speed and other performance parameters.

Each family of microprocessors executes instructions that are unique to the processor family. The collective set of instructions that a processor or family of processors can execute is known as the processor's instruction set. As an example, the instruction set used by the Intel 80X86 processor family is incompatible with the instruction set used by the PowerPC processor family. The Intel 80X86 instruction set is based on the Complex Instruction Set Computer (CISC) format, while the Motorola PowerPC instruction set is based on the Reduced Instruction Set Computer (RISC) format. CISC processors use a large number of instructions, some of which can perform rather complicated functions, but which generally require many clock cycles to execute. RISC processors, on the other hand, use a smaller number of available instructions to perform a simpler set of functions that are executed at a much higher rate.

The uniqueness of the processor family among computer systems also typically results in incompatibility among the other elements of hardware architecture of the computer systems. A computer system manufactured with a processor from the Intel 80X86 processor family will have a hardware architecture that is different from the hardware architecture of a computer system manufactured with a processor from the PowerPC processor family. Because of the uniqueness of the processor instruction set and a computer system's hardware architecture, application software programs are typically written to run on a particular computer system running a particular operating system.

Generally speaking, computer manufacturers try to maximize their market share by having more rather than fewer applications run on the microprocessor family associated with the computer manufacturers' product line. To expand the number of operating systems and application programs that can run on a computer system, a field of technology has developed in which a given computer having one type of CPU, called a host, will include a virtualizer program that allows the host computer to emulate the instructions of an unrelated type of CPU, called a guest. Thus, the host computer will execute an application that will cause one or more host instructions to be called in response to a given guest instruction, and in this way the host computer can both run software designed for its own hardware architecture and software written for computers having an unrelated hardware architecture.

As a more specific example, a computer system manufactured by Apple Computer, for example, may run operating systems and programs written for PC-based computer systems. It may also be possible to use virtualizer programs to execute concurrently on a single CPU multiple incompatible operating systems. In this latter arrangement, although each operating system is incompatible with the other, virtualizer programs can host each of the several operating systems and thereby allowing the otherwise incompatible operating systems to run concurrently on the same host computer system.

When a guest computer system is emulated on a host computer system, the guest computer system is said to be a "virtual machine" as the guest computer system only exists in the host computer system as a pure software representation of the operation of one specific hardware architecture. Thus, an operating system running inside virtual machine software such as Microsoft's Virtual PC may be referred to as a "guest" and/or a "virtual machine," while the operating system running the virtual machine software may be referred to as the "host." The terms virtualizer, emulator, direct-executor, virtual machine, and processor emulation are sometimes used interchangeably to denote the ability to mimic or emulate the hardware architecture of an entire computer system using one or several approaches known and appreciated by those of skill in the art. Moreover, all uses of the term "emulation" in any form is intended to convey this broad meaning and is not intended to distinguish between instruction execution concepts of emulation versus direct-execution of operating system instructions in the virtual machine. Thus, for example, Virtual PC software available from Microsoft Corporation "emulates" (by instruction execution emulation and/or direct execution) an entire computer that includes an Intel 80X86 Pentium processor and various motherboard components and cards, and the operation of these components is "emulated" in the virtual machine that is being run on the host machine. A virtualizer program executing on the operating system software and hardware architecture of the host computer, such as a computer system having a PowerPC processor, mimics the operation of the entire guest computer system.

The general case of virtualization allows one processor architecture to run OSes and programs from other processor architectures (e.g., PowerPC Mac programs on x86 Windows, and vice versa), but an important special case is when the underlying processor architectures are the same (run various versions of x86 Linux or different versions of x86 Windows on x86). In this latter case, there is the potential to execute the Guest OS and its applications more efficiently since the underlying instruction set is the same. In such a case, the guest instructions are allowed to execute directly on the processor without losing control or leaving the system open to attack (i.e., the Guest OS is sandboxed). This is where the separation of privileged versus non-privileged and the techniques for controlling access to memory comes into play. For virtualization where there is an architectural mismatch (PowerPC <-> x86), two approaches could be used: instruction-by-instruction emulation (relatively slow) or translation from the guest instruction set to the native instruction set (more efficient, but uses the translation step). If instruction emulation is used, then it is relatively easy to make the environment robust; however, if translation is used, then it maps back to the special case where the processor architectures are the same.

In accordance with the invention, the guest operating systems are virtualized and thus an exemplary scenario in accordance with the invention would be emulation of a Windows95®, Windows98®, Windows 3.1, or Windows NT 4.0 operating system on a Virtual Server available from Microsoft Corporation. In various embodiments, the invention thus describes systems and methods for controlling guest access to some or all of the underlying physical resources (memory, devices, etc.) of the host computer.

The virtualizer program acts as the interchange between the hardware architecture of the host machine and the instructions transmitted by the software (e.g., operating systems, applications, etc.) running within the emulated environment. This virtualizer program may be a host operating system (HOS), which is an operating system running directly on the physical computer hardware (and which may comprise a hypervisor). Alternately, the emulated environment might also be a virtual machine monitor (VMM) which is a software layer that runs directly above the hardware, perhaps running side-by-side and working in conjunction with the host operating system, and which can virtualize all the resources of the host machine (as well as certain virtual resources) by exposing interfaces that are the same as the hardware the VMM is virtualizing. This virtualization enables the virtualizer (as well as the host computer system itself) to go unnoticed by operating system layers running above it.

Processor emulation thus enables a guest operating system to execute on a virtual machine created by a virtualizer running on a host computer system comprising both physical hardware and a host operating system.

From a conceptual perspective, computer systems generally comprise one or more layers of software running on a foundational layer of hardware. This layering is done for reasons of abstraction. By defining the interface for a given layer of software, that layer can be implemented differently by other layers above it. In a well-designed computer system, each layer only knows about (and only relies upon) the immediate layer beneath it. This allows a layer or a "stack" (multiple adjoining layers) to be replaced without negatively impacting the layers above the layer or stack. For example, software applications (upper layers) typically rely on lower levels of the operating system (lower layers) to write files to some form of permanent storage, and these applications do not need to understand the difference between writing data to a floppy disk, a hard drive, or a network folder. If this lower layer is replaced with new operating system components for writing files, the operation of the upper layer software applications remains unaffected.

The flexibility of layered software allows a virtual machine (VM) to present a virtual hardware layer that is in fact another software layer. In this way, a VM can create the illusion for the software layers above it that the software layers are running on their own private computer system, and thus VMs can allow multiple "guest systems" to run concurrently on a single "host system." This level of abstraction is represented by the illustration of FIG. 2A.

Figure 2A:
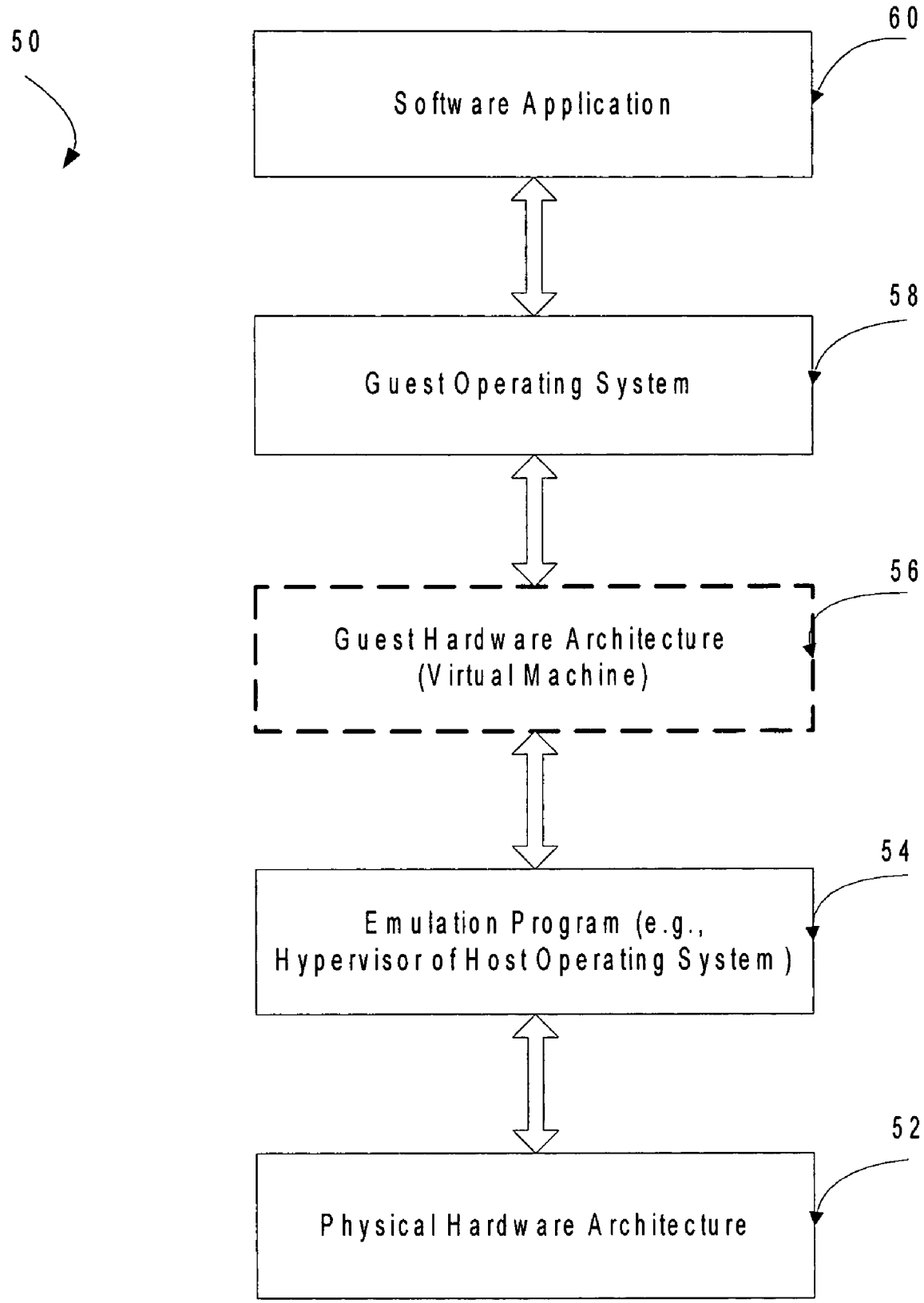
FIG. 2A is a block diagram representing the logical layering of the hardware and software architecture for an emulated operating environment in a computer system.

FIG. 2A is a diagram representing the logical layering of the hardware and software architecture for an emulated operating environment in a computer system. In the figure, an emulation program 54 runs directly or indirectly on the physical hardware architecture 52. Emulation program 54 may be (a) a virtual machine monitor that runs alongside a host operating system, (b) a specialized host operating system having native emulation capabilities, or (c) a host operating system with a hypervisor component wherein the hypervisor component performs the emulation. Emulation program 54 emulates a guest hardware architecture 56 (shown as broken lines to illustrate the fact that this component is the "virtual machine," that is, hardware that does not actually exist but is instead emulated by the emulation program 54). A guest operating system 58 executes on the guest hardware architecture 56, and software application 60 runs on the guest operating system 58. In the emulated operating environment of FIG. 2A—and because of the operation of emulation program 54—software application 60 may run in computer system 50 even if software application 60 is designed to run on an operating system that is generally incompatible with the host operating system and hardware architecture 52.

Figure 2B:
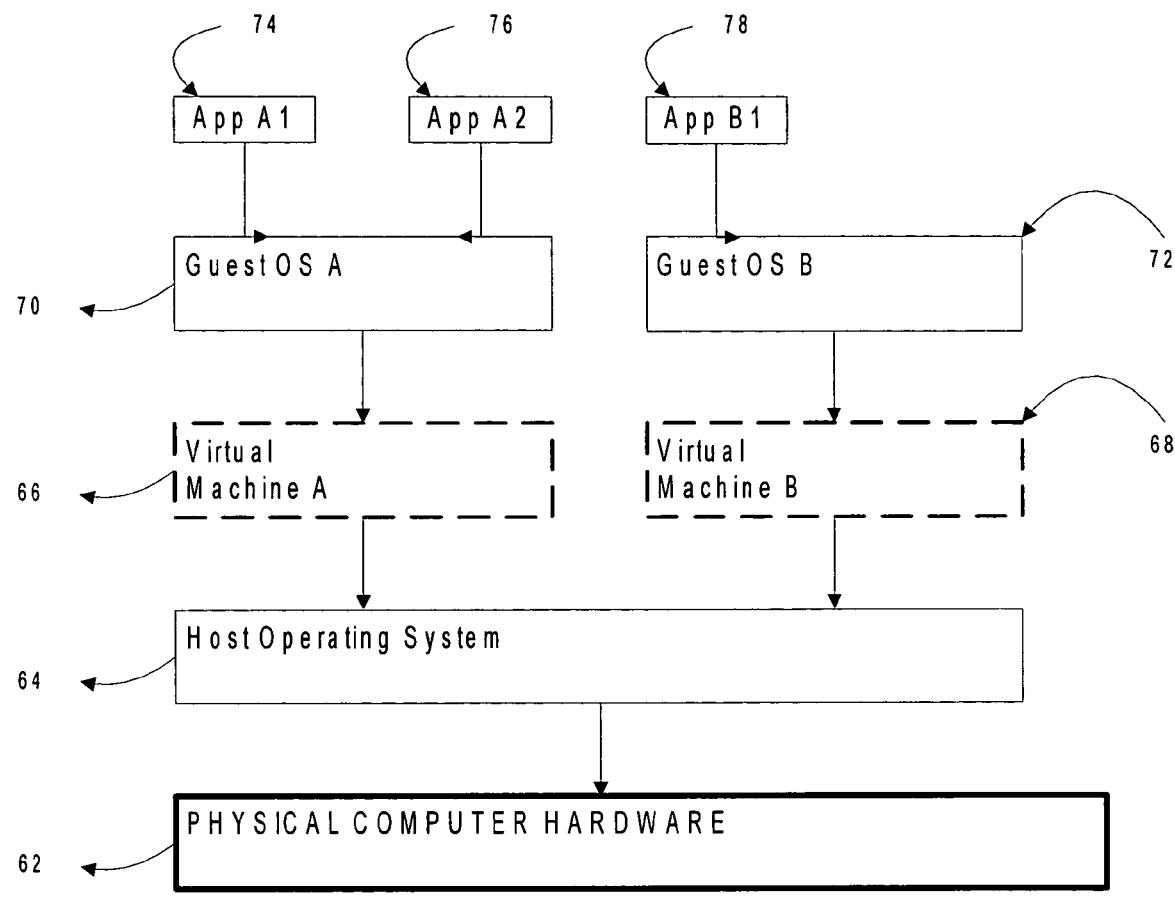
FIG. 2B is a block diagram representing a virtualized computing system wherein the emulation is performed by the host operating system (either directly or via a hypervisor)

FIG. 2B illustrates a virtualized computing system comprising a host operating system software layer 64 running directly above physical computer hardware 62 where the host operating system (host OS) 64 provides access to the resources of the physical computer hardware 62 by exposing interfaces that are the same as the hardware the host OS is emulating (or "virtualizing")—which, in turn, enables the host OS 64 to go unnoticed by operating system layers running above it. Again, to perform the emulation the host OS 64 may be a specially designed operating system with native emulations capabilities or, alternately, it may be a standard operating system with an incorporated hypervisor component for performing the emulation (not shown).

As shown in FIG. 2B, above the host OS 64 are two virtual machine (VM) implementations, VM A 66, which may be, for example, a virtualized Intel 386 processor, and VM B 68, which may be, for example, a virtualized version of one of the Motorola 680X0 family of processors. Above each VM 66 and 68 are guest operating systems (guest OSes) A 70 and B 72 respectively. Running above guest OS A 70 are two applications, application A1 74 and application A2 76, and running above guest OS B 72 is application B1 78.

In regard to FIG. 2B, it is important to note that VM A 66 and VM B 68 (which are shown in broken lines) are virtualized computer hardware representations that exist only as software constructions and which are made possible due to the execution of specialized emulation software(s) that not only presents VM A 66 and VM B 68 to Guest OS A 70 and Guest OS B 72 respectively, but which also performs all of the software steps necessary for Guest OS A 70 and Guest OS B 72 to indirectly interact with the real physical computer hardware 62.

Figure 2C:
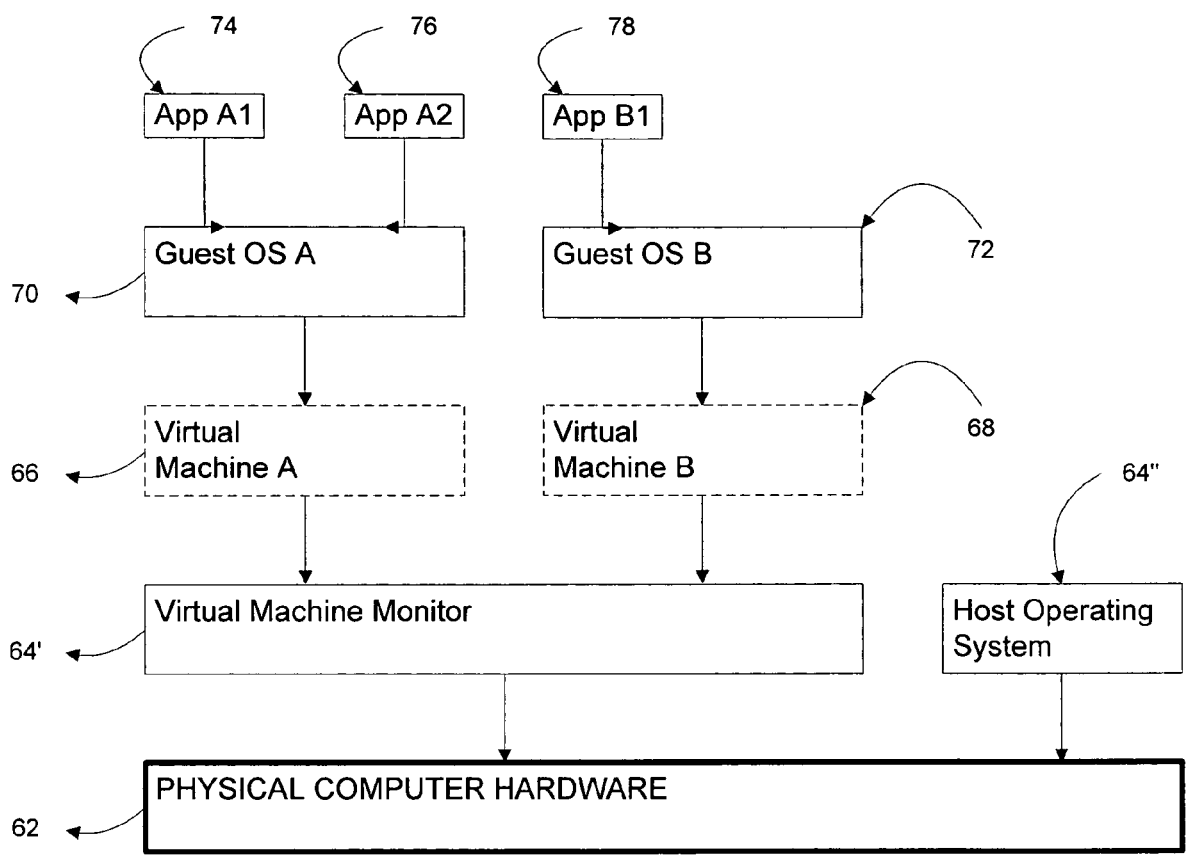
FIG. 2C is a block diagram representing an alternative virtualized computing system wherein the emulation is performed by a virtual machine monitor running side-by-side with a host operating system.

FIG. 2C illustrates an alternative virtualized computing system wherein the emulation is performed by a virtual machine monitor (VMM) 64' running alongside the host operating system 64". For certain embodiments the VMM 64' may be an application running above the host operating system 64" and interacting with the physical computer hardware 62 only through the host operating system 64". In other embodiments, and as shown in FIG. 2C, the VMM 64' may instead comprise a partially independent software system that on some levels interacts indirectly with the computer hardware 62 via the host operating system 64" but on other levels the VMM 64' interacts directly with the computer hardware 62 (similar to the way the host operating system interacts directly with the computer hardware). And in yet other embodiments, the VMM 64' may comprise a fully independent software system that on all levels interacts directly with the computer hardware 62 (similar to the way the host operating system 64" interacts directly with the computer hardware 62) without utilizing the host operating system 64" (although still interacting with the host operating system 64" insofar as coordinating use of the computer hardware 62 and avoiding conflicts and the like).

All of these variations for implementing the virtual machine are anticipated to form alternative embodiments of the invention as described herein, and nothing herein should be interpreted as limiting the invention to any particular emulation embodiment. In addition, any reference to interaction between applications 74, 76, and 78 via VM A 66 and/or VM B 68 respectively (presumably in a hardware emulation scenario) should be interpreted to be in fact an interaction between the applications 74, 76, and 78 and the virtualizer that has created the virtualization. Likewise, any reference to interaction between applications VM A 66 and/or VM B 68 with the host operating system 64 and/or the computer hardware 62 (presumably to execute computer instructions directly or indirectly on the computer hardware 62) should be interpreted to be in fact an interaction between the virtualizer that has created the virtualization and the host operating system 64 and/or the computer hardware 62 as appropriate.

Combining Network Objects in a VM System

Figure 3:
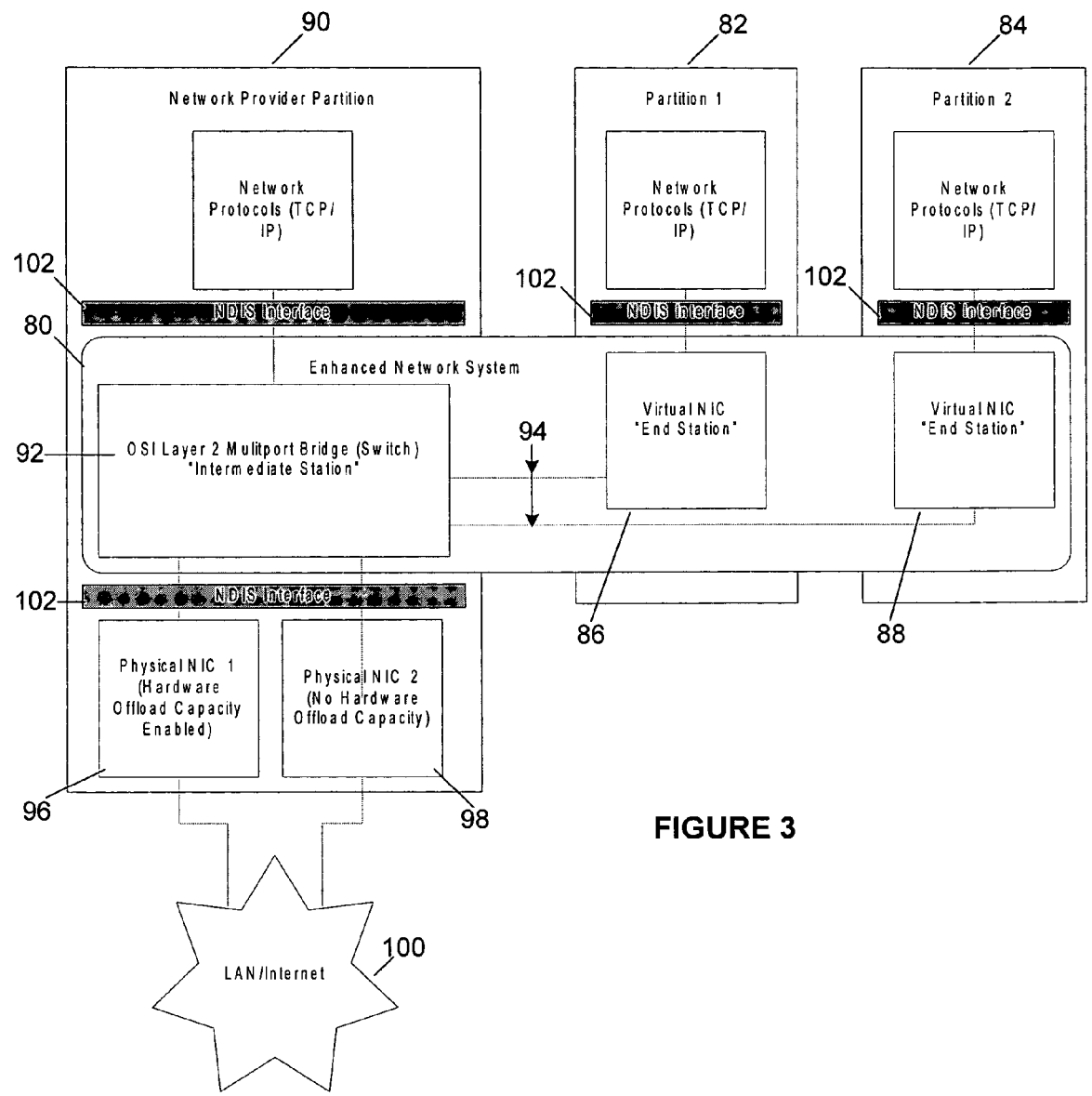
FIG. 3 illustrates the enhanced network system of the invention whereby VM software partitions 1 and 2 contain the source and destination network objects while the network provider software partition contains the intermediate station that is to be combined with the source and/or destination network objects.

The invention provides solutions to the problems presented above by creating an enhanced network system in which one or more source or destination network objects (end stations) are combined with one or more intermediate network objects. FIG. 3 illustrates the enhanced network system 80 of the invention whereby VM software partitions 1 (82) and 2 (84) contain the source and destination network objects (end stations) 86, 88, respectively, while the network provider software partition 90 contains the intermediate network object (intermediate station) 92 that is to be combined with the source and/or destination network objects 86, 88. In FIG. 3, there are only two end station partitions whereby the communication path will be constrained only by system resources.

Generally speaking, the enhanced network system of FIG. 3 does not have to be different from a traditional network system. In the FIG. 3 embodiment, the virtual network interface cards (NICs) 86 and 88 inside of VM software partitions 1 (82) and 2 (84) may be NDIS miniport drivers that fully frame an Ethernet packet and send the packet to the network provider partition 90 through a software bus 94. A switch 92 inside of the network provider partition 90 may use the destination MAC address in the Ethernet packet to route the packet to the appropriate destination. In an exemplary embodiment, switch 92 is an OSI layer 2 multiport bridge implemented as an NDIS intermediate driver that satisfies the IEEE 802.3d switch specification for the implementation of VLANs, priority queuing, or any other standard switch functionality. As illustrated, the network provider partition 90 may further include a physical NIC 1 (96) that has hardware offload capacity (e.g., TOE) enabled and a physical NIC 2 (98) that does not have any hardware offload capacity. The hardware offload capacity may also be implemented as a large send offload whereby the physical NIC breaks a single large TCP/IP packet (that may otherwise be too large or inappropriate to transmit) into multiple segments according to the MTU of the network. Each of these physical NICS 96, 98 provides data to/from network provider partition 90 and partitions 1 (82) and 2 (84) and a data network such LAN/Internet 100. In accordance with the invention, while working in this mode the packet framing taking place inside of the end stations 86 and 88 based on the appropriate network protocols (e.g., TCP/IP) are not able to take advantage of the hardware offload capacity in physical NIC 1 (96) even if the data is destined to go through that connection to the data network 100. As illustrated, the enhanced network system 80 is plugged into the respective partitions via standard NDIS interfaces 102.

Figure 4:
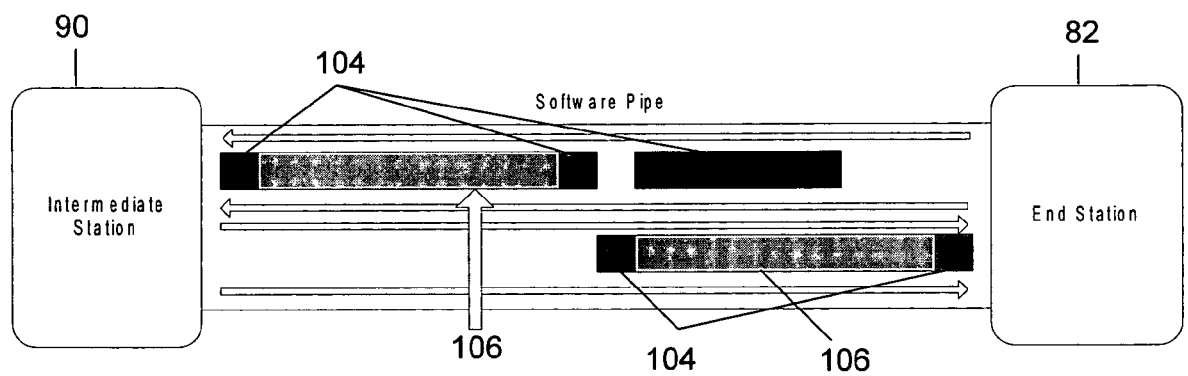
FIG. 4 illustrates how the enhanced network system of the invention sends control data and Ethernet packets.

FIG. 4 illustrates how the enhanced network system 80 of the invention sends control data and Ethernet packets amongst the partitions via a software pipe. In FIG. 4, the rectangles illustrate data packets being sent between the end station 82 and the intermediate station 90. As shown, the end station 82 sends control data 104 that is followed by an Ethernet frame 106 encapsulated with control data 104 as illustrated. The intermediate station 90 relays the Ethernet frame 106 to an end station 82 as illustrated. As will be appreciated by those skilled in the art, in this example the control data is essentially at OSI layer 1.5.

Figure 5A:
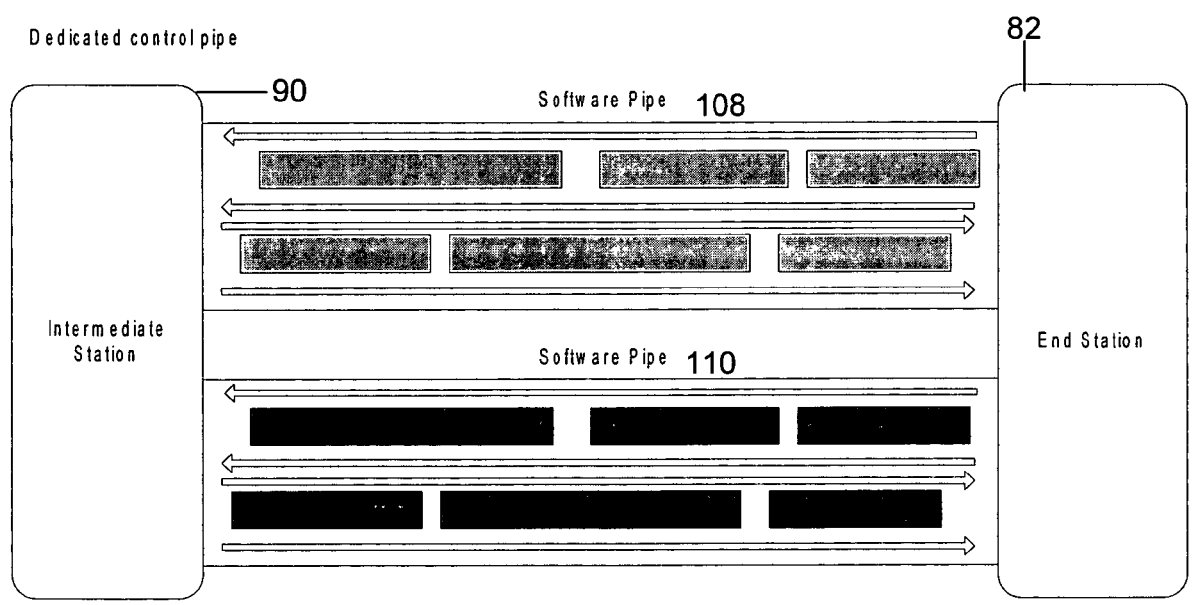
FIG. 5A illustrates an alternative to the embodiment of FIG. 4 in which the control message has a dedicated pipe while the Ethernet frames also have a dedicated pipe.

Alternatively, as shown in FIG. 5A, the control message may be transmitted between the end station 82 and intermediate station 90 via a dedicated software pipe (back channel) 108 while the Ethernet frames are transmitted via a separate dedicated software pipe 110. In a normal network environment, the connections between adjacent network objects are made by a single standard channel, such as software pipe 110, through which fully framed packets are sent through the network. On the other hand, software pipe 108 in accordance with the invention serves as an out-of-band control channel between the network objects and is independent of the standard full packet channel (software pipe 110). Software pipe 108 provides direct communications between adjacent network objects and sends control data to adjacent network objects.

Figure 5B:
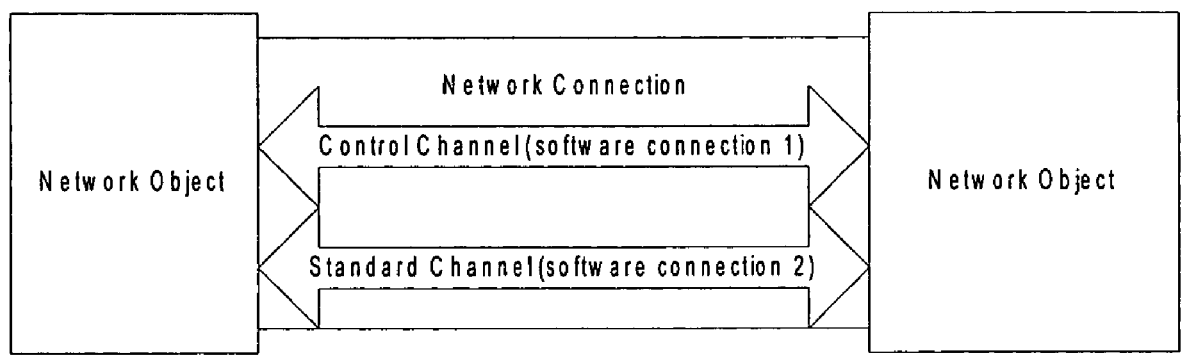
FIG. 5B illustrates the embodiment of FIG. 5A where the control channel is a software connection.
Figure 5C:
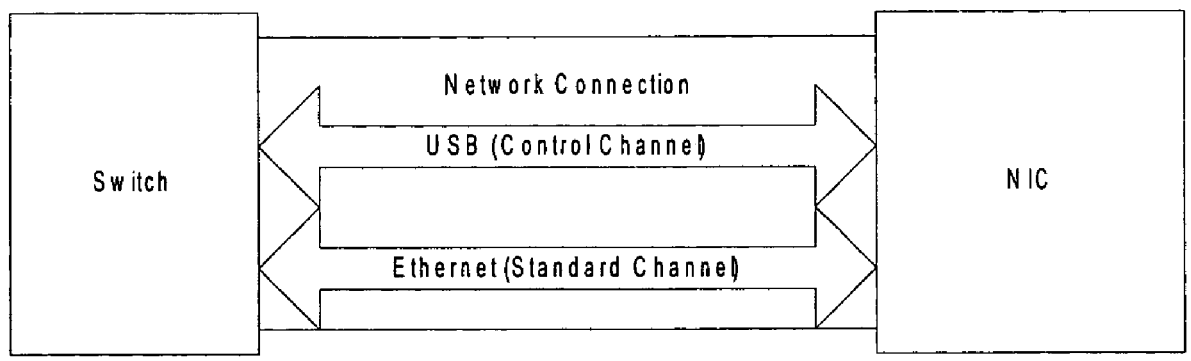
FIG. 5C illustrates the embodiment of FIG. 5A where the control channel is implemented using a USB connection.
Figure 5D:
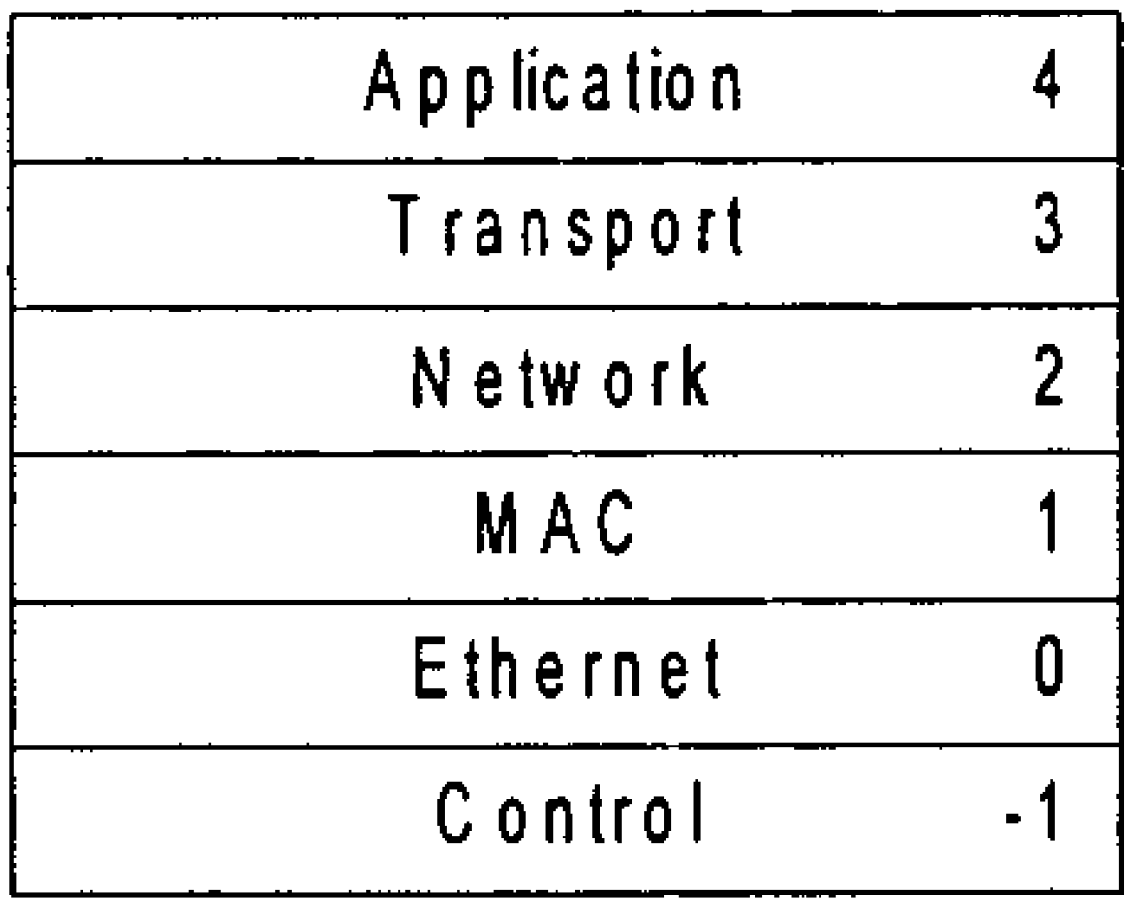
FIG. 5D illustrates the embodiment of FIG. 5A where the control channel is established by sub-layering in the standard channel.
Figure 5E:
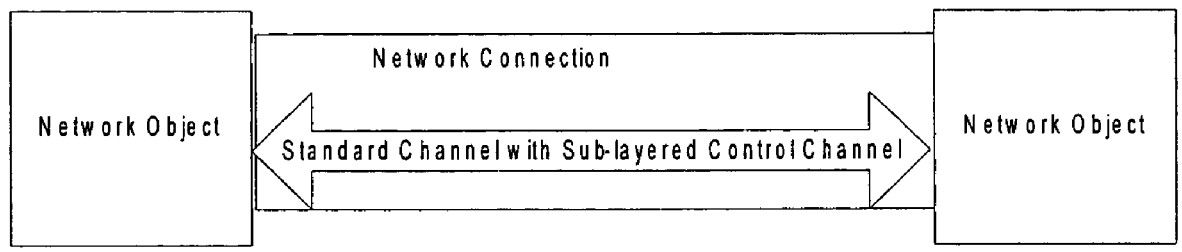
FIG. 5E illustrates the single dual-purpose channel for implementing the embodiment of FIG. 5D.

In the embodiment of FIG. 5A, the back channel 108 is used to send control data to adjacent network objects in one of two ways. First, if the channels between the network objects are easily creatable, then the back channel 108 can be created in a similar fashion to the conventional software pipe 110 and the two channels can become a single network connection. This scenario is readily available in a virtual machine environment where the second channel is a software connection as illustrated in FIG. 5B. This configuration is also possible in a physical environment at a much higher cost. A possible scenario might include putting a packet bus such as a USB port on a NIC and switch and using the packet bus connection as the control channel as shown in FIG. 5C. Those skilled in the art will appreciate that other packet bus connections such as firewire and Bluetooth may also be used. The second way a control channel can be established is by sub-layering the control channel 108 in the standard channel 110. As illustrated in FIG. 5D, if a new layer is created below the lowest defined layer of the standard defined stacking layer for the packets being sent, then the network object can send control data without perturbing the standard packets. As a result, the connection between the two network objects using the second method may have a single dual-purpose channel as shown in FIG. 5E.

The enhanced network system 80 of the invention enables the virtual NICs 86, 88 of the partitions to send unframed data to the switch 92. This is accomplished in accordance with the invention by the virtual NIC 86 or 88 sending control information 104 to the switch 92 using the techniques of FIG. 4 or 5 requesting a data path to the destination network object. In accordance with standard intelligent switching techniques, the switch 92 will determine where the path should be created (either to a physical NIC such as physical NIC 96, a network protocol, or to another virtual NIC) and sets up the mechanisms for controlling the reception of data on the path so that the end stations need not do so. In the case where the path is created to the physical NIC 1 (96), for example, the unframed data will then be framed by the physical NIC 1 (96) in hardware using hardware assist techniques such as TOE, thus significantly reducing the amount of CPU processing required to send the packet. On the other hand, in the case where the packet was destined for the physical NIC 2 (98), the network protocol, or another partition's end station, then the data path will be only to the switch 92 since none of these connections support the framing in hardware. Data sent by the source partition (source network object) will then be framed and routed by the switch 92 thereby fooling the source partition into thinking that the framing was done in hardware. Although framing the packet by the switch 92 will require the same amount of CPU processing time as the virtual NIC framing implementation, there still will be savings in the communication required between the two components since the virtual NIC 86, 88 can send the data in a single large section instead of individually framed segments, resulting in a net packet reduction.

Figure 6:
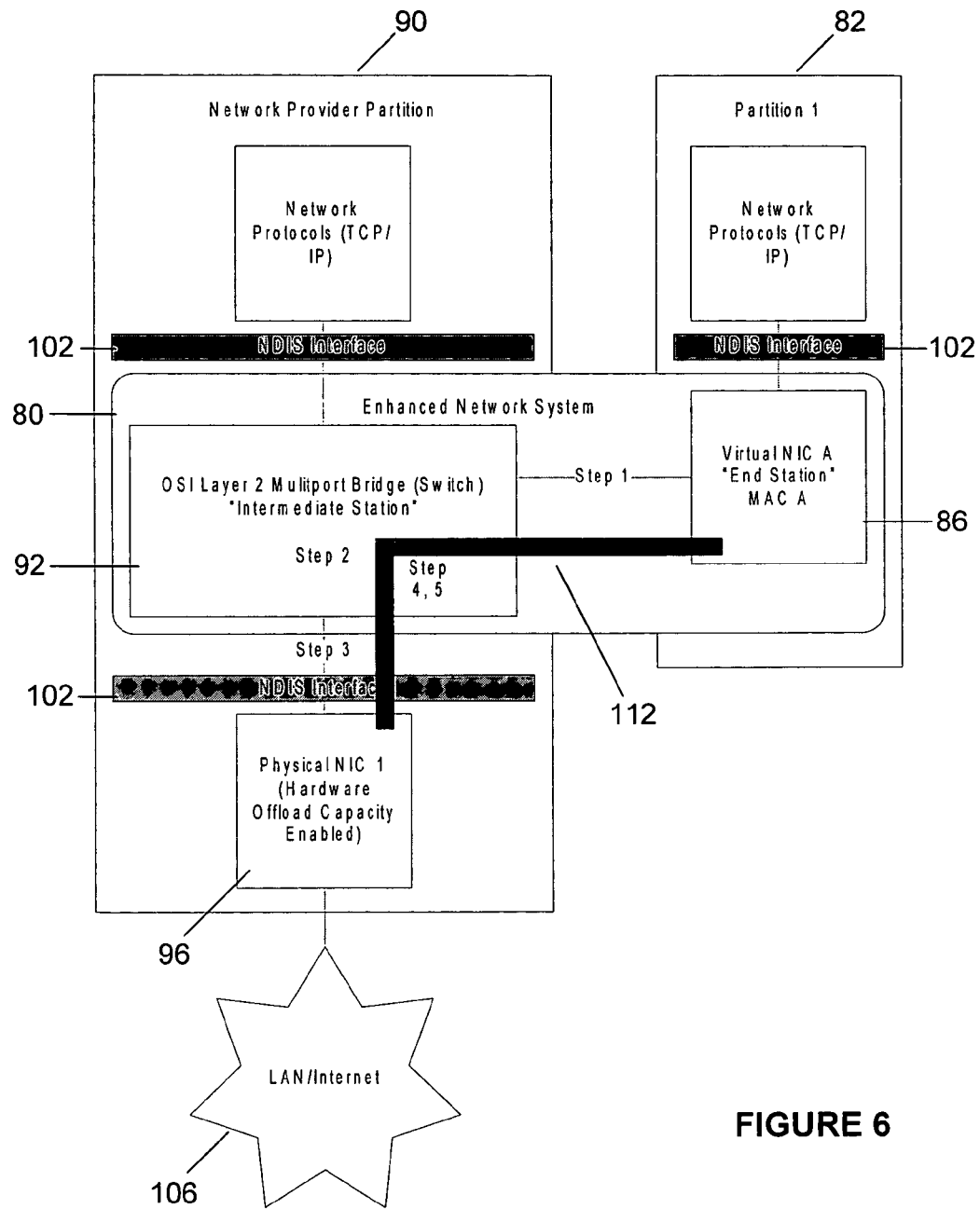
FIG. 6 illustrates a TCP/IP offload engine connection being established between a virtual NIC in partition 1 and the physical NIC of the network provider partition.
Figure 6:
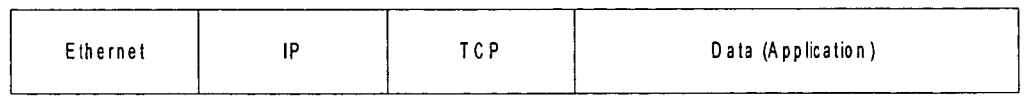

FIG. 6 illustrates a TCP/IP offload engine connection being established between virtual NIC A 86 in partition 1 (82) and the physical NIC 1 (96) of the network provider partition 90. In this example, the virtual NIC A 86 sends a control packet 104 to the switch 92 requesting a TOE connection be established to MAC address C (step 1). The switch 92 looks up the port corresponding to MAC address C in its routing tables and learns that physical NIC 1 (96) is the target destination network object (step 2). The switch 92 then forwards the TOE request to the physical NIC 1 (96) and the physical NIC 1 (96) accepts the connection. A path 112 is then created for data to flow from virtual NIC A 86 to the hardware offload (TOE) in physical NIC 1 (96) (step 4). Once the path 112 is created, all associated data sent or received through the TOE connection will use the path 112 (step 5), thereby allowing virtual NIC A 86 to directly take advantage of the hardware 96 owned by the network provider partition 90. As illustrated at the bottom of FIG. 6, a TOE request contains all the data for appending the Ethernet, IP and TCP headers to the application's data. Since the TOE offload has the information necessary to add the headers, those skilled in the art will appreciate that step 5 involves only sending the data across the path created in step 4.

Figure 7:
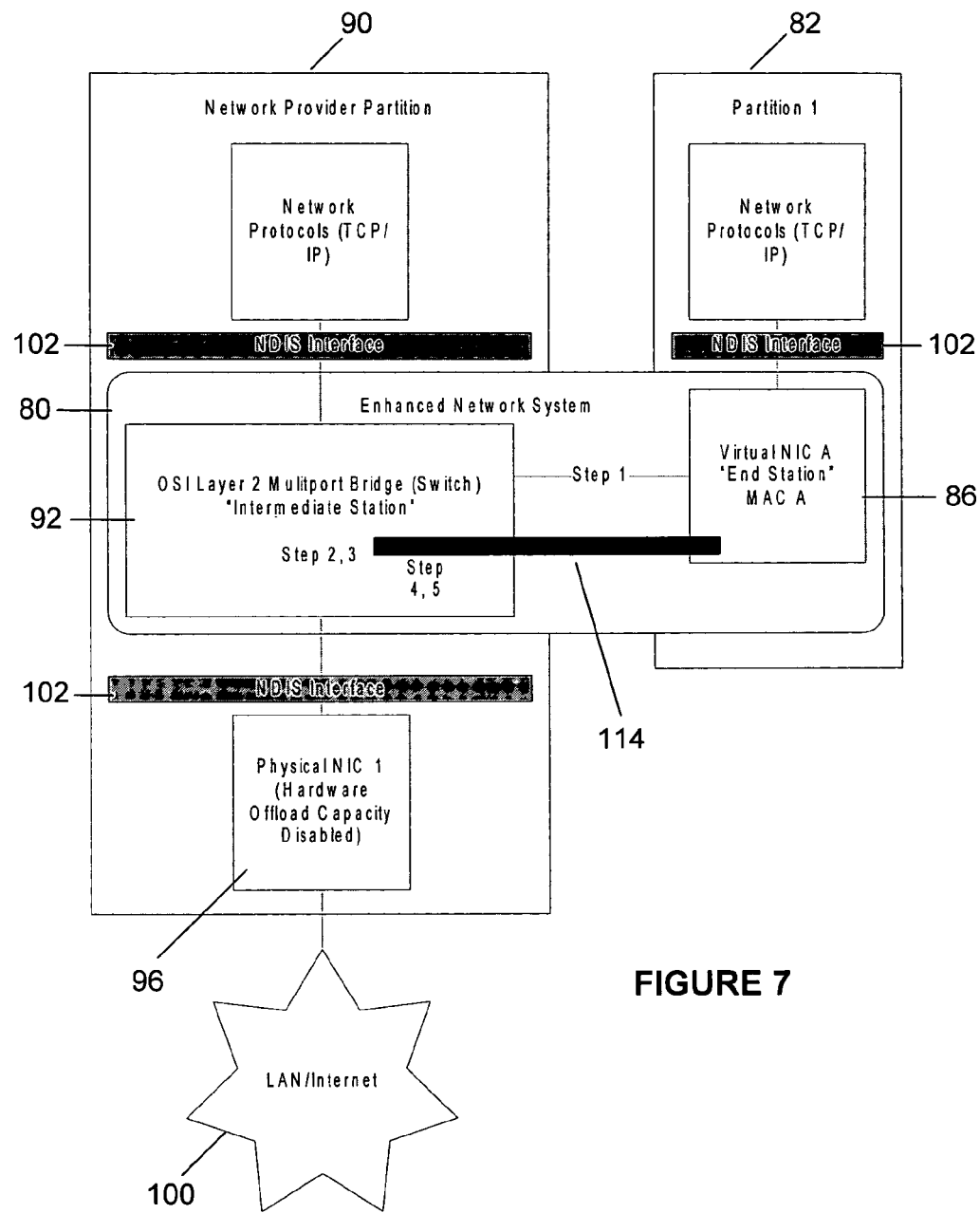
FIG. 7 illustrates a TCP/IP offload engine connection being established between a virtual NIC in partition 1 and a switch in the network provider partition.
Figure 7:

FIG. 7 illustrates a TCP/IP offload engine connection being established between a virtual NIC A 86 in partition 1 (82) and the switch 92 in the network provider partition 90. In this example, the virtual NIC A 86 sends a control packet 104 to the switch 92 requesting a TOE connection be established to MAC address C (step 1). The switch 92 looks up the port corresponding to MAC address C in its routing tables and learns that physical NIC 1 (96) is the target destination network object (step 2). However, in this example, the hardware offload capacity of physical NIC 1 (96) is disabled. Since the switch 92 knows that physical NIC 1 (96) cannot support a TOE connection, the switch 92 sets up the proper structures to handle the TOE data sends itself (step 3). A path 114 is then created for data to flow from virtual NIC A 86 to the virtual offload in switch 92 (step 4). Once the path 114 is created, all associated data sent or received through the TOE connection will use the path 114 (step 5), thereby allowing virtual NIC A 86 to think that offload hardware exists when it does not. Although the CPU will still be tasked with prepending the headers to the application's data in this embodiment, the overall performance will still be increased since the number of messages being sent to virtual NIC A 86 will be decreased through TCP acknowledgment (ACK) coalescing and TCP segmentation in the switch 92. As in the FIG. 6 embodiment, a TOE request contains all the data for appending the Ethernet, IP and TCP headers to the application's data. Since the TOE offload has the information necessary to add the headers, those skilled in the art will appreciate that step 5 involves only sending the data across the path created in step 4.

The enhanced network system 80 of the invention also permits the VM system to reconfigure the network topology on the fly when it can increase overall system performance. An example of network topology reconfiguration on the fly will be explained with respect to the topology change over a single intermediate station (FIG. 8) and a topology progression of a reconfiguration of the network topology of FIG. 1 over multiple intermediate stations (FIG. 9) utilizing the techniques of the invention.

Figure 8:
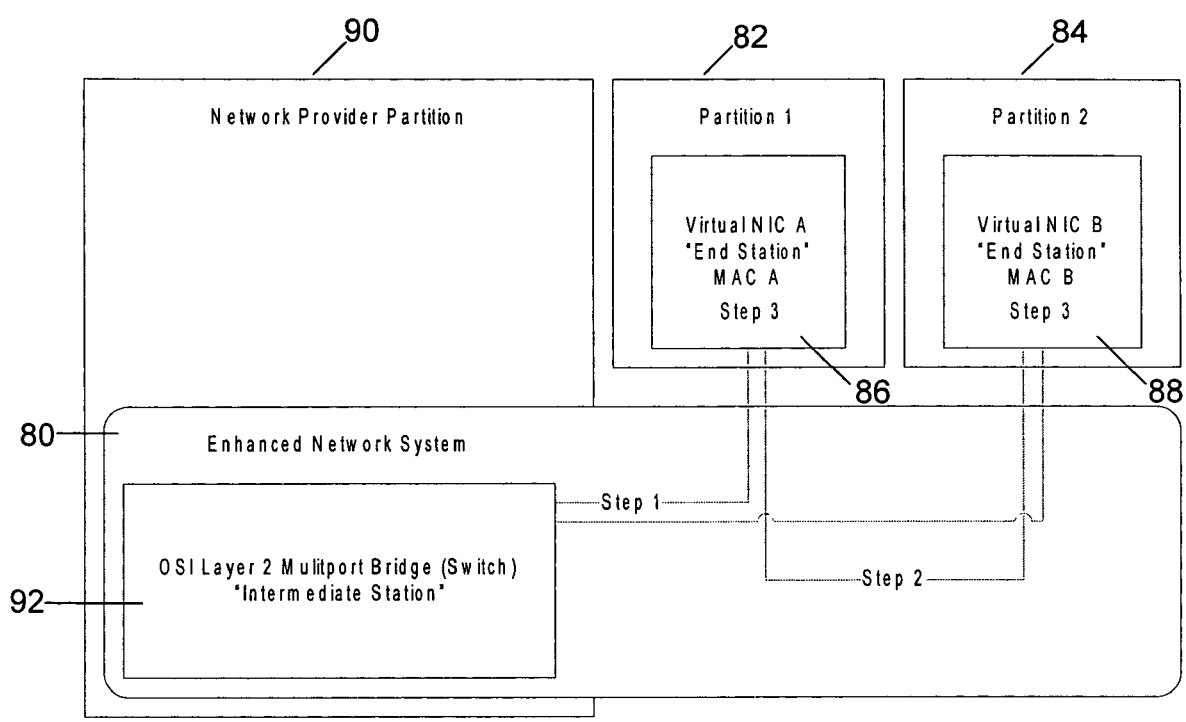
FIG. 8 illustrates a topology change over a single intermediate station.

FIG. 8 illustrates a topology change on the fly where there is only a single intermediate station (network provider partition 90) between end stations (partitions 1 (82) and partition 2 (84)). In this example, the switch 92 of the network provider partition 90 sends a control message to the virtual NIC A 86 telling it that the machine with MAC B is located at partition 2 (84) (step 1). Virtual NIC A 86 then offers a software pipe to the virtual NIC B 88 of partition 2 (84) (step 2). Upon acceptance of the software pipe, virtual NIC A 86 sends all subsequent packets addressed to MAC B through the software pipe to virtual NIC B 88 (step 3). Likewise, virtual NIC B 88 sends all subsequent packets addressed to MAC A through the software pipe it accepted in step 2.

Figure 9A:
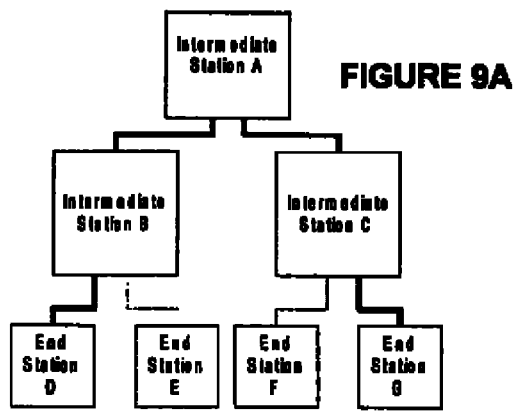
FIG. 9 illustrates a topology change over multiple intermediate stations.
Figure 9B:
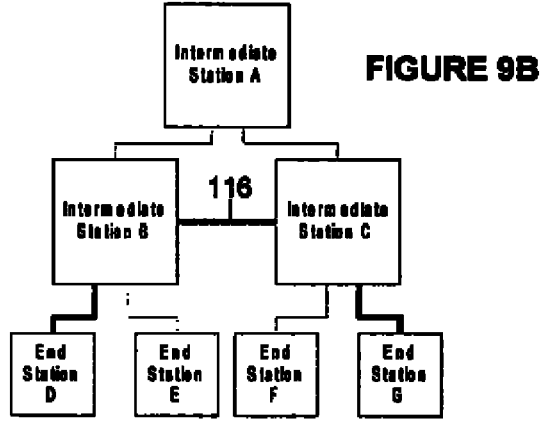

As illustrated in FIG. 9A for an example of a topology progression of a reconfiguration of the network topology of FIG. 1 for multiple intermediate stations, end station (source network object) D sends numerous packets to end station G via intermediate stations (network objects) A, B and C. A switch in, for example, intermediate station A recognizes that a virtual NIC of intermediate station B and a virtual NIC of intermediate station C need to be connected for some reason. This could be caused by recognition by intermediate station A of heavy traffic between the virtual NICs of intermediate stations B and C or some user configurable setting. Intermediate station A sends control signals 104 as in FIG. 4 or 5 to intermediate stations B and C instructing these stations to change the topology. For example, the switch of intermediate station A may send a message to both virtual NICs of intermediate stations B and C telling them of the address and the partition ID to which they should create a connection. The address allows them to route their own packets to their newly created connections. One virtual NIC offers a connection to the other virtual NIC, and a connection 116 between intermediate stations B and C is established as illustrated in FIG. 9B. Then, packets destined for the virtual NIC of the other intermediate station are now sent through the new connection and intermediate station A is bypassed.

Figure 9C:
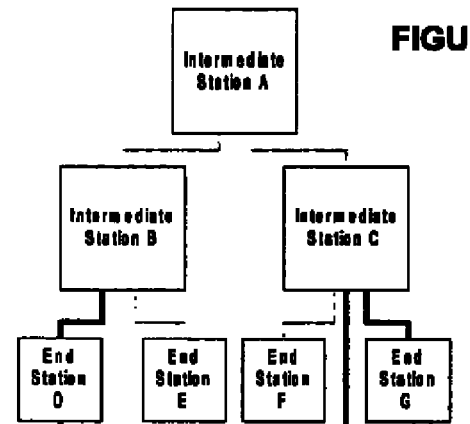

Then, starting with the configuration in FIG. 9B, a switch in intermediate station B may recognize that a virtual NIC or physical NIC of end station D is sending heavy traffic to intermediate station C. Intermediate station B sends control signals 104 as in FIG. 4 or 5 to end station D and intermediate station C instructing these stations to change the topology. As above, the switch of intermediate station B may send a message to both the NICs of end station D and intermediate station C telling them of the address and the partition ID to which they should create a connection. The address allows them to route their own packets to their newly created connections. One NIC offers a connection to the other NIC, and a connection 118 between end station D and intermediate station C is established as illustrated in FIG. 9C. Then, packets destined for the NIC of the other station are now sent through the new connection 118 and intermediate station B and connection 116 are bypassed.

Figure 9D:
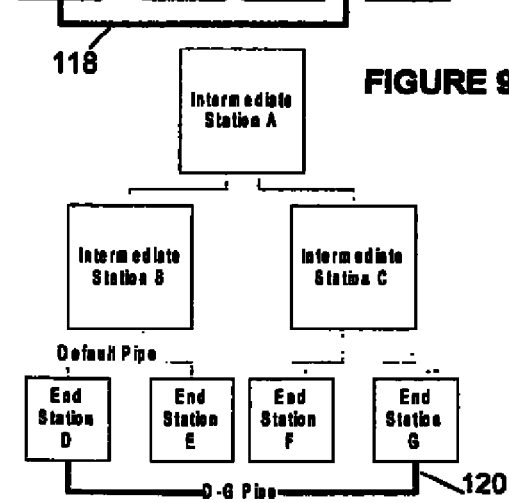

Next, starting with the configuration in FIG. 9C, a switch in intermediate station C may recognize that a virtual NIC or physical NIC of end station D is sending heavy traffic to end station G. Intermediate station C thus sends control signals 104 as in FIG. 4 or 5 to end stations D and G instructing these stations to change the topology. As above, the switch of intermediate station C may send a message to both the NICs of end stations D and G telling them of the address and the partition ID to which they should create a connection. The address allows them to route their own packets to their newly created connections. One NIC offers a connection to the other NIC, and a direct connection (D-G pipe) 120 between end stations D and G is established as illustrated in FIG. 9D. Then, packets destined for the NIC of the other end station are now sent through the D-G pipe 120 and intermediate station C and connection 118 are bypassed.

Thus, so long as end station G's MAC address is known, the destination software pipe D-G 120 may be used to optimally send data between source end station D and destination end station G. However, if the address of end station G is not known, then a default pipe will be used. As known to those skilled in the art, the default pipe is the first established network connection where full frames are sent and destinations are learned by the intermediate station snooping and recording information from the passing packets.

In accordance with another embodiment of the invention, the enhanced network system 80 enables the virtual NICs 86, 88 and the switch 92 to exchange network information such as the maximum transmission unit (MTU) of the network 100 to which the virtual NICs 86, 88 are connected. For example, in the embodiment of FIG. 10, the network information, such as the MTU, may be changed by the network provider partition 90. In this embodiment, the switch 92 determines that a property or event has changed inside the network (e.g., the MTU), and the switch 92 pushes the new property or event through a control message 104 (FIGS. 4, 5) to the virtual NICs 86, 88 of the end stations 82, 84. The adjustment in the network property is thus made by the switch 92.

Figure 11:
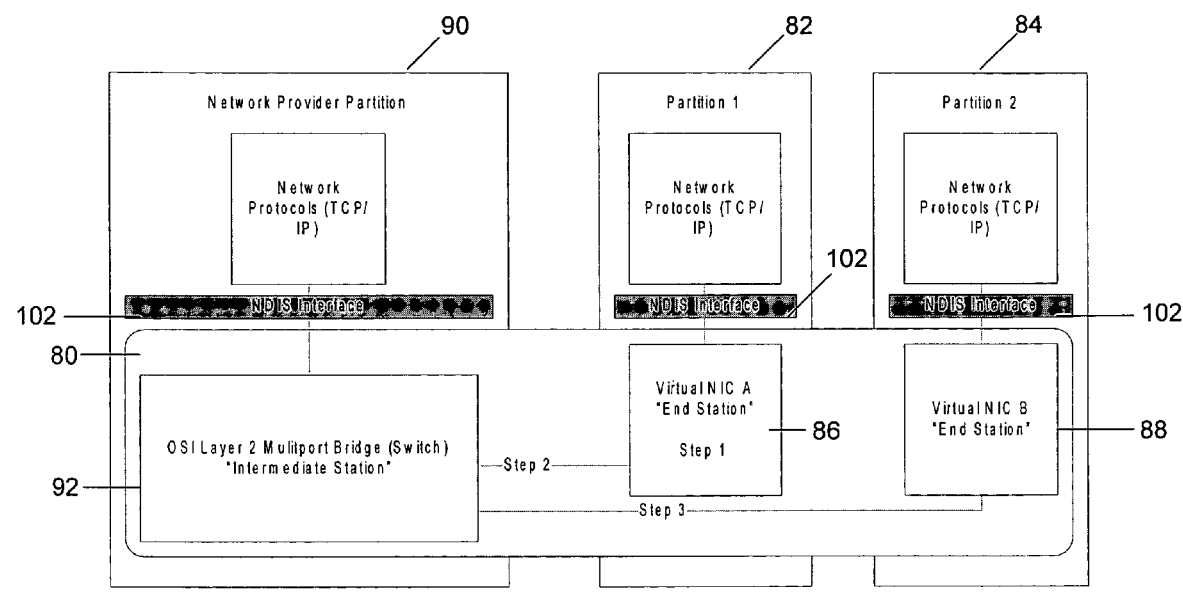
FIG. 11 illustrates a network property being changed at an end station and propagated through the network.

On the other hand, the network property may be changed by propagating the new value of the network property through the network from a source network object. In the example of FIG. 11, virtual NIC A 86 determines that a property or event has changed inside the network (e.g., the MTU), and the virtual NIC A 86 pushes the new property or event through a control message 104 (FIGS. 4, 5) to the switch 92. The switch 92, in turn, pushes the new property or event through a control message 104 to all other NICs.

Figure 10:
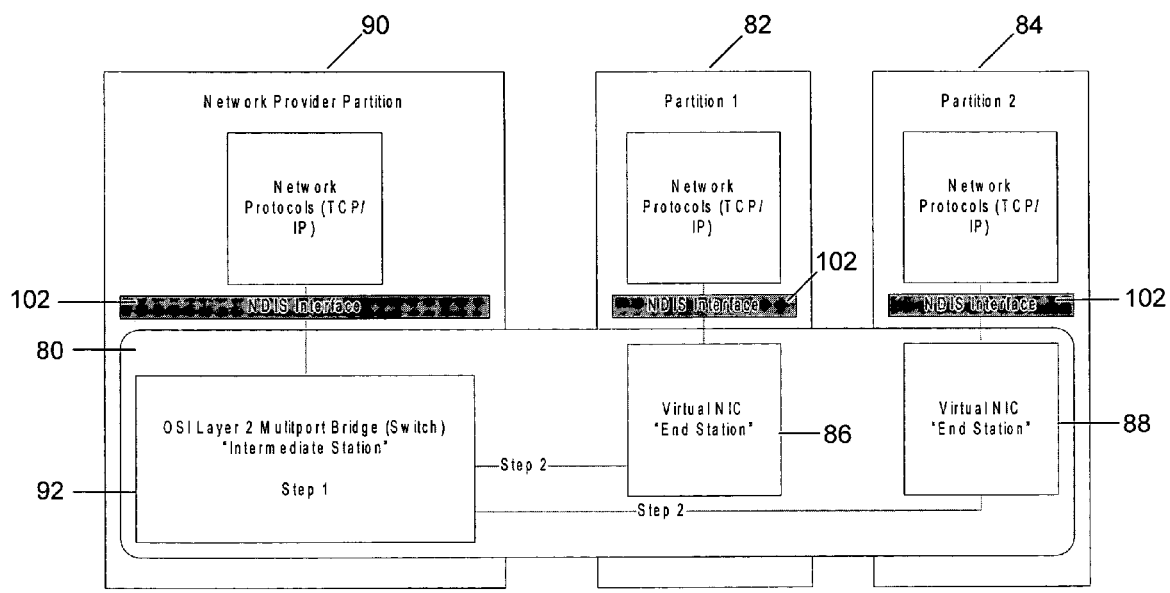
FIG. 10 illustrates a network property being changed by the intermediate station.

The data exchanges described with respect to FIGS. 10 and 11 becomes important in the implementation of the invention because the MTU of the network 100 can change drastically depending on the switch 92 to which the virtual NIC 86, 88 is connected. For example, the MTU of the switch 92 when connecting partitions 1 and 2 in FIG. 3 might be 64K. However, if a physical NIC 96 is added to the switch 92 then the MTU of network 100 must be dropped to 1500 bytes, therefore necessitating the need to update the MTU in the virtual NICs 86, 88 of partitions 1 and 2.

Those skilled in the art will appreciate that, in virtual environments, the pipes and communication paths described herein may be hardwired connections or virtual connections implemented as a software virtual bus connection between partitions. A virtual bus connection models a hardware bus and may provide a low level protocol for creating and destroying such communication paths that an end station may use to communicate with other partitions using the techniques described herein.

Exemplary Networked and Distributed Environments

One of ordinary skill in the art can appreciate that the invention can be implemented in connection with any suitable host computer or other client or server device, which can be deployed as part of a computer network, or in a distributed computing environment. In this regard, the invention pertains to any computer system or environment having any number of memory or storage units, and any number of applications and processes occurring across any number of storage units or volumes, which may be used in connection with virtualizing a guest OS in accordance with the invention. The invention may apply to an environment with server computers and client computers deployed in a network environment or distributed computing environment, having remote or local storage. The invention may also be applied to standalone computing devices, having programming language functionality, interpretation and execution capabilities for generating, receiving and transmitting information in connection with remote or local services.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes of the invention.

Figure 12A:
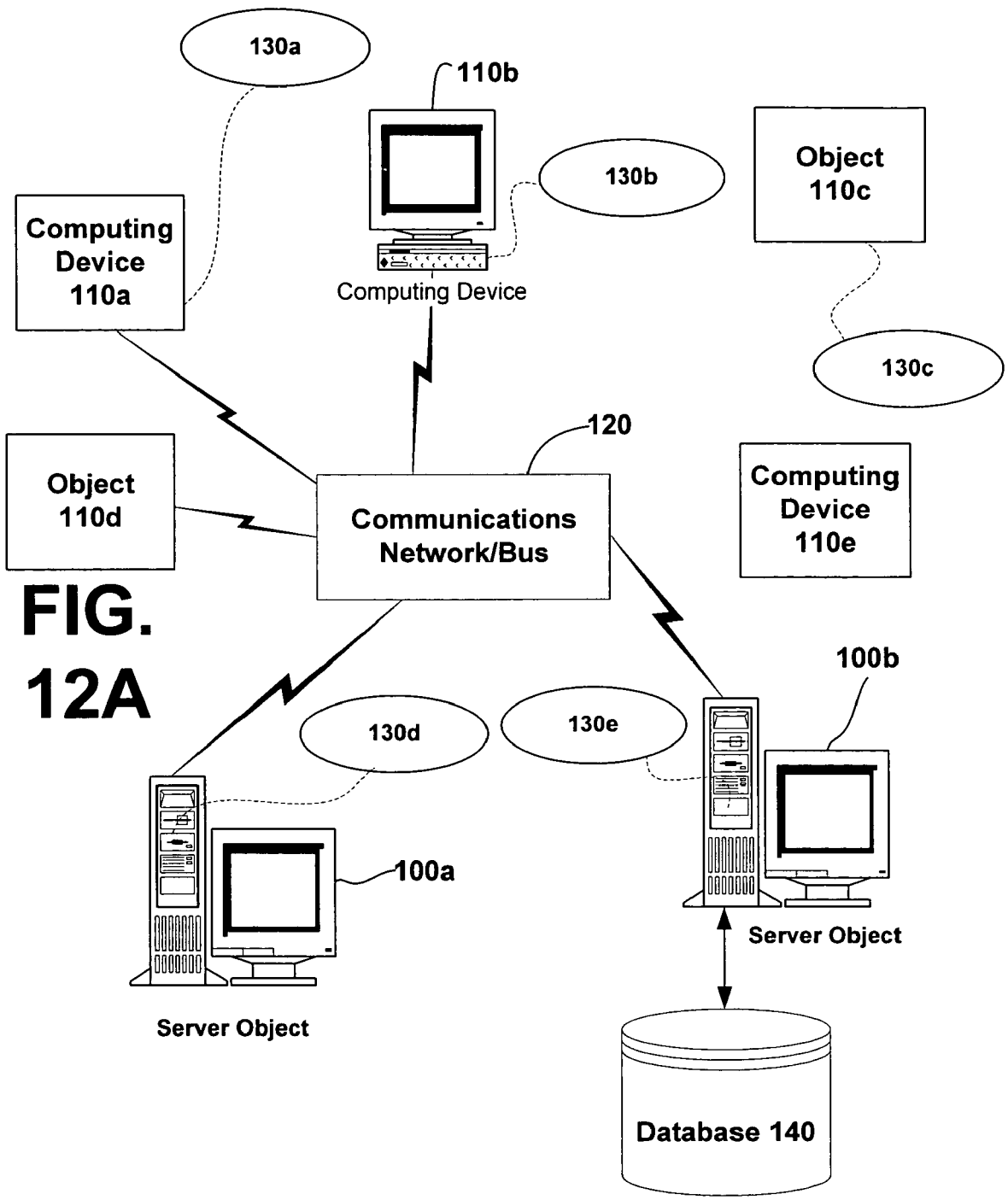
FIG. 12A is a block diagram representing an exemplary network environment having a variety of computing devices in which the invention may be implemented.

FIG. 12A provides a schematic diagram of an exemplary networked or distributed computing environment. The distributed computing environment comprises computing objects 100a, 100b, etc. and computing objects or devices 110a, 110b, 110c, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 120. This network may itself comprise other computing objects and computing devices that provide services to the system of FIG. 12A, and may itself represent multiple interconnected networks. In accordance with an aspect of the invention, each object 100a, 100b, etc. or 110a, 110b, 110c, etc. may contain an application that might make use of an API, or other object, software, firmware and/or hardware, to request use of the virtualization processes of the invention.

It can also be appreciated that an object, such as 110c, may be hosted on another computing device 100a, 100b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to the virtualization processes of the invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge as protocol standards may be interconnected to form a network, such as an intranet, that may be connected to the outside world by way of the Internet. In short, a variety of disparate sources exist for the storage and transmission of data, and consequently, moving forward, computing devices will require ways of sharing data, such as data accessed or utilized incident to program objects, which make use of the virtualized services in accordance with the invention.

The Internet commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the network(s). Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 12A, computers 110a, 110b, etc. can be thought of as clients and computers 100a, 100b, etc. can be thought of as the server where server 100a, 100b, etc. maintains the data that is then replicated in the client computers 110a, 110b, etc., although any computer can be considered a client, a server, or both, depending on the circumstances. Any of these computing devices may be processing data or requesting services or tasks that may implicate an implementation of the architectures of the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to making use of the virtualized architecture(s) of the invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

FIG. 12A illustrates an exemplary networked or distributed environment, with a server in communication with client computers via a network/bus, in which the invention may be employed. In more detail, a number of servers 100a, 100b, etc., are interconnected via a communications network/bus 120, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like. It is thus contemplated that the invention may apply to any computing device in connection with which it is desirable to implement guest interfaces and operating systems in accordance with the invention.

In a network environment in which the communications network/bus 120 is the Internet, for example, the servers 100a, 110b, etc. can be Web servers with which the clients 110a, 110b, 110c, 110d, 110e, etc. communicate via any of a number of known protocols such as HTTP. Servers 100a, 100b, etc. may also serve as clients 110a, 110b, 110c, 110d, 110e, etc., as may be characteristic of a distributed computing environment.

Communications may be wired or wireless, where appropriate. Client devices 110a, 110b, 110c, 110d, 110e, etc. may or may not communicate via communications network/bus 120, and may have independent communications associated therewith. For example, in the case of a TV or VCR, there may or may not be a networked aspect to the control thereof. Each client computer 110a, 110b, 110c, 110d, 110e, etc. and server computer 100a, 100b, etc. may be equipped with various application program modules or objects 130 and with connections or access to various types of storage elements or objects, across which files or data streams may be stored or to which portion(s) of files or data streams may be downloaded, transmitted or migrated. Any one or more of computers 100a, 100b, 110a, 110b, etc. may be responsible for the maintenance and updating of a database 140 or other storage element, such as a database or memory 140 for storing data processed according to the invention. Thus, the invention can be utilized in a computer network environment having client computers 110a, 110b, etc. that can access and interact with a computer network/bus 120 and server computers 100a, 100b, etc. that may interact with client computers 110a, 110b, etc. and other like devices, and databases 140.

Exemplary Computing Device

Figure 12B:
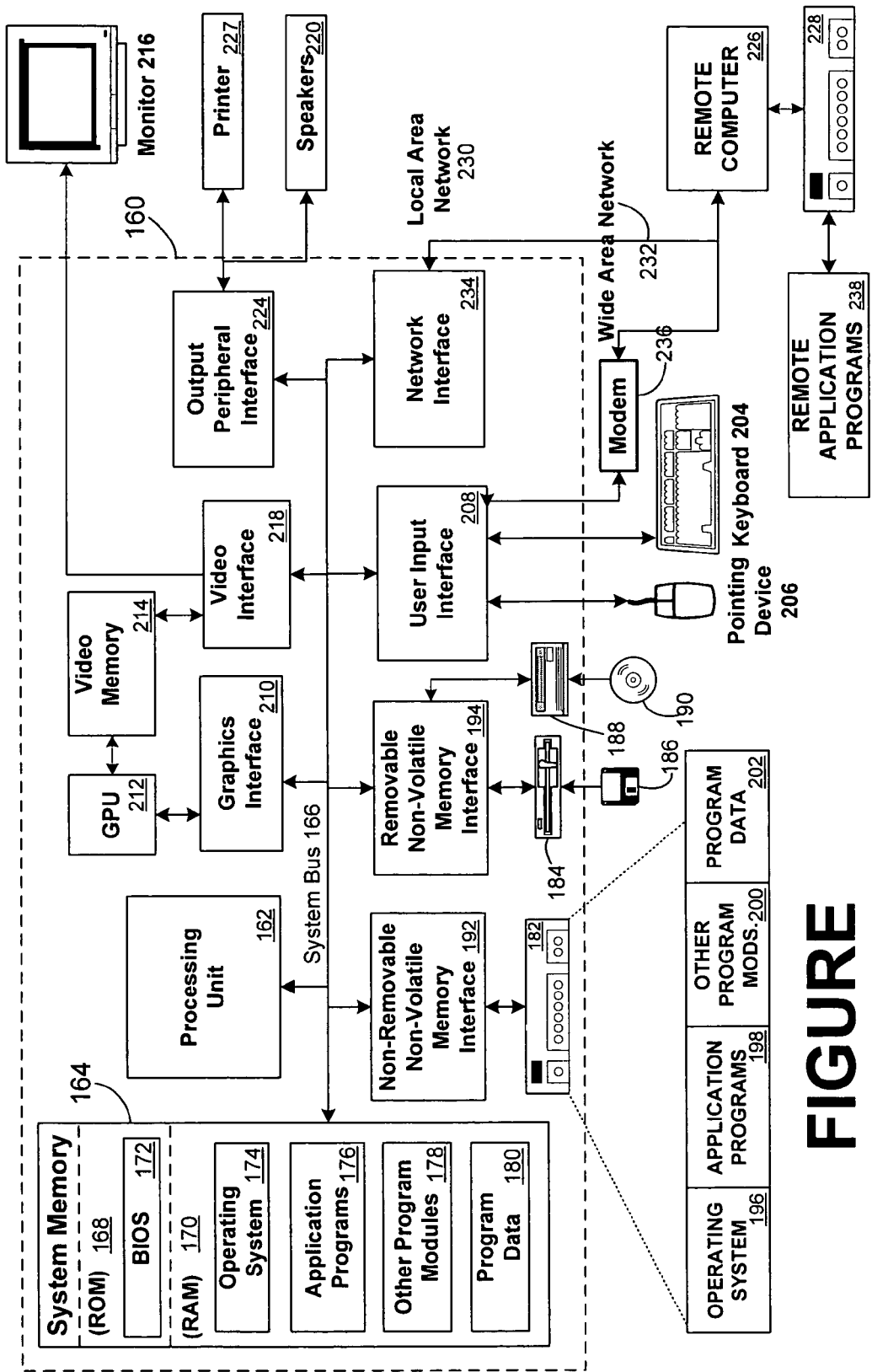
FIG. 12B is a block diagram representing an exemplary non-limiting host computing device in which the invention may be implemented.

FIG. 12B and the following discussion are intended to provide a brief general description of a suitable host computing environment in connection with which the invention may be implemented. It should be understood, however, that handheld, portable and other computing devices and computing objects of all kinds are contemplated for use in connection with the invention. While a general purpose computer is described below, this is but one example, and the invention may be implemented with a thin client having network/bus interoperability and interaction. Thus, the invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the virtualization techniques in accordance with the invention.

Although not required, the invention can be implemented in whole or in part via an operating system, for use by a developer of services for a device or object, and/or included within application software that operates in connection with the virtualized OS of the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. As noted above, the invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 12B illustrates an example of a suitable host computing system environment 150 in which the invention may be implemented, although as made clear above, the host computing system environment 150 is only one example of a suitable computing environment and is not intended to suggest any limitation as to the scope of use or functionality of the invention. Neither should the computing environment 150 be interpreted as having any dependency or requirement relating to any one or combination of components illustrated in the exemplary operating environment 150.

With reference to FIG. 12B, an exemplary system for implementing the invention includes a general purpose computing device in the form of a computer 160. Components of computer 160 may include, but are not limited to, a processing unit 162, a system memory 164, and a system bus 166 that couples various system components including the system memory to the processing unit 162. The system bus 166 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus (also known as Mezzanine bus), and PCI Express (PCIe).

Computer 160 typically includes a variety of computer readable media. Computer readable media can be any available media that can be accessed by computer 160 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 160. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 164 includes computer storage media in the form of volatile and/or nonvolatile memory such as read only memory (ROM) 168 and random access memory (RAM) 170. A basic input/output system 172 (BIOS), containing the basic routines that help to transfer information between elements within computer 160, such as during start-up, is typically stored in ROM 168. RAM 170 typically contains data and/or program modules that are immediately accessible to and/or presently being operated on by processing unit 162. By way of example, and not limitation, FIG. 12B illustrates operating system 174, application programs 176, other program modules 178, and program data 180.

The computer 160 may also include other removable/non-removable, volatile/nonvolatile computer storage media. By way of example only, FIG. 12B illustrates a hard disk drive 182 that reads from or writes to non-removable, nonvolatile magnetic media, a magnetic disk drive 184 that reads from or writes to a removable, nonvolatile magnetic disk 186, and an optical disk drive 188 that reads from or writes to a removable, nonvolatile optical disk 190, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 182 is typically connected to the system bus 166 through a non-removable memory interface such as interface 192, and magnetic disk drive 184 and optical disk drive 188 are typically connected to the system bus 166 by a removable memory interface, such as interface 194.

The drives and their associated computer storage media discussed above and illustrated in FIG. 12B provide storage of computer readable instructions, data structures, program modules and other data for the computer 160. In FIG. 12B, for example, hard disk drive 182 is illustrated as storing operating system 196, application programs 198, other program modules 200 and program data 202. Note that these components can either be the same as or different from operating system 174, application programs 176, other program modules 178 and program data 180. Operating system 196, application programs 198, other program modules 200 and program data 202 are given different numbers here to illustrate that, at a minimum, they are different copies. A user may enter commands and information into the computer 160 through input devices such as a keyboard 204 and pointing device 206, commonly referred to as a mouse, trackball or touch pad. Other input devices (not shown) may include a microphone, joystick, game pad, satellite dish, scanner, or the like. These and other input devices are often connected to the processing unit 162 through a user input interface 208 that is coupled to the system bus 166, but may be connected by other interface and bus structures, such as a parallel port, game port or a universal serial bus (USB). These are the kinds of structures that are virtualized by the architectures of the invention. A graphics interface 210, such as one of the interfaces implemented by the Northbridge, may also be connected to the system bus 166. Northbridge is a chipset that communicates with the CPU, or host processing unit 162, and assumes responsibility for communications such as PCI, PCIe and accelerated graphics port (AGP) communications. One or more graphics processing units (GPUs) 212 may communicate with graphics interface 210. In this regard, GPUs 212 generally include on-chip memory storage, such as register storage and GPUs 212 communicate with a video memory 214. GPUs 212, however, are but one example of a coprocessor and thus a variety of coprocessing devices may be included in computer 160, and may include a variety of procedural shaders, such as pixel and vertex shaders. A monitor 216 or other type of display device is also connected to the system bus 166 via an interface, such as a video interface 218, which may in turn communicate with video memory 214. In addition to monitor 216, computers may also include other peripheral output devices such as speakers 220 and printer 222, which may be connected through an output peripheral interface 224.

The computer 160 may operate in a networked or distributed environment using logical connections to one or more remote computers, such as a remote computer 226. The remote computer 226 may be a personal computer, a server, a router, a network PC, a peer device or other common network node, and typically includes many or all of the elements described above relative to the computer 160, although only a memory storage device 228 has been illustrated in FIG. 12B. The logical connections depicted in FIG. 12B include a local area network (LAN) 230 and a wide area network (WAN) 232, but may also include other networks/buses. Such networking environments are commonplace in homes, offices, enterprise-wide computer networks, intranets and the Internet.

When used in a LAN networking environment, the computer 160 is connected to the LAN 230 through a network interface or adapter 234. When used in a WAN networking environment, the computer 160 typically includes a modem 236 or other means for establishing communications over the WAN 232, such as the Internet. The modem 236, which may be internal or external, may be connected to the system bus 166 via the user input interface 208, or other appropriate mechanism. In a networked environment, program modules depicted relative to the computer 160, or portions thereof, may be stored in the remote memory storage device. By way of example, and not limitation, FIG. 12B illustrates remote application programs 238 as residing on memory device 228. It will be appreciated that the network connections shown are exemplary and other means of establishing a communications link between the computers may be used.

There are multiple ways of implementing the invention, e.g., an appropriate API, tool kit, driver code, operating system, control, standalone or downloadable software object, etc. which enables applications and services to use the virtualized architecture(s), systems and methods of the invention. The invention contemplates the use of the invention from the standpoint of an API (or other software object), as well as from a software or hardware object that receives any of the aforementioned techniques in accordance with the invention. Thus, various implementations of the invention described herein may have aspects that are wholly in hardware, partly in hardware and partly in software, as well as in software.

As mentioned above, while exemplary embodiments of the invention have been described in connection with various computing devices and network architectures, the underlying concepts may be applied to any computing device or system in which it is desirable to emulate guest software. For instance, the various algorithm(s) and hardware implementations of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the virtualization techniques of the invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the invention. Additionally, any storage techniques used in connection with the invention may invariably be a combination of hardware and software.

While the invention has been described in connection with the preferred embodiments of the various figures, it is to be understood that other similar embodiments may be used or modifications and additions may be made to the described embodiment for performing the same function of the invention without deviating therefrom. For example, while exemplary network environments of the invention are described in the context of a networked environment, such as a peer to peer networked environment, one skilled in the art will recognize that the invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the invention in the context of a guest OS virtualized on a host OS, the invention is not so limited, but rather may be implemented to virtualize a second specialized processing unit cooperating with a main processor for other reasons as well. Moreover, the invention contemplates the scenario wherein multiple instances of the same version or release of an OS are operating in separate virtual machines according to the invention. It can be appreciated that the virtualization of the invention is independent of the operations for which the guest OS is used. It is also intended that the invention applies to all computer architectures, not just the Windows architecture. Still further, the invention may be implemented in or across a plurality of processing chips or devices, and storage may similarly be effected across a plurality of devices. Therefore, the invention should not be limited to any single embodiment, but rather should be construed in breadth and scope in accordance with the appended claims.

What is claimed:

1. A virtual machine system, comprising:
   at least one processor;
   at least one memory coupled to said processor;
   computer executable instructions stored in said at least one memory that when executed by said at least one processor instantiate at least a source network object providing a virtual network interface card (NIC), an intermediate network object providing network switching, and a destination network object providing a second virtual NIC, comprising:
   computer executable instructions stored in said at least one memory that when executed by said at least one processor instantiate a network channel that connects said source network object, said intermediate network object, and said destination network object, said network channel being configured to send framed data packets among said source network object, said intermediate network object, and said destination network object;

computer executable instructions stored in said at least one memory that when executed by said at least one processor instantiate a control channel that is separate from said network channel and connects at least two of said source network object, said intermediate network object, and said destination network object, said control channel being configured to send control data messages between said at least two network objects, wherein said control data messages enable respective network objects to setup a path for the sending of not fully framed data packets, therebetween; and computer executable instructions stored in said at least one memory that when executed by said at least one processor cause one of said network objects receiving a TCP/IP offload engine (TOE) connection request to determine that said TOE connection request should not be forwarded when the network object receiving the TOE connection request controls a physical NIC which can perform the TOE connection request in hardware or the network object receiving the TOE connection request is unable to find an adjacent network object which could handle the TOE connection request.

2. A virtual machine system as in claim 1, wherein said control channel comprises a software connection between respective network objects.

3. A virtual machine system as in claim 1, wherein said control channel comprises a packet bus connection between respective network objects.

4. A virtual machine system as in claim 1, wherein said control data messages comprise a sub-protocol of a standard protocol stack for the framed data packets.

5. A virtual machine system as in claim 1, wherein said control data messages include routing/topology data for reconfiguring the respective network objects to change a routing of said framed data packets between at least said intermediate network object and said destination network object.

6. A virtual machine system as in claim 1, wherein said control data messages include TCP/IP checksums.

7. A virtual machine system as in claim 1, wherein said control data messages include a request that a TCP/IP offload engine (TOE) connection be established.

8. A virtual machine system as in claim 7, wherein a network object receiving said TOE connection request looks up a port corresponding to the network address of the TOE connection request in a routing table to determine that the particular network address is available via an adjacent network object and establishes a communication link between the network object that sent said TOE connection request and the determined adjacent network object by forwarding said received TOE connection request to the adjacent network object.

9. A virtual machine system as in claim 7, wherein if a network object receiving said TOE connection request determines that the TOE connection request should not be forwarded, said network object handles the TOE connection request locally.

10. A virtual machine system as in claim 1, wherein said control data messages enable a network object besides the source network object to break apart a partially or fully framed data packet using a large send offload.

11. A virtual machine system as in claim 1, wherein said control data messages enable a network object besides the source network object to frame said data packets with meta data including routing information for each data packet and information on what each data packet contains for transmission to another network object via said network channel.

12. A virtual machine system as in claim 11, wherein said network object besides the source network object offloads a received message to framing hardware that frames said message into TCP/IP packets.

13. A virtual machine system as in claim 1, wherein said control data messages include at least one network property of a network object.

14. A virtual machine system as in claim 13, wherein said network property comprises a maximum transmission unit (MTU) size for a communication path between respective network objects.

* * * * *